(12) United States Patent
Yong

(10) Patent No.: US 7,475,981 B2
(45) Date of Patent: Jan. 13, 2009

(54) AUXILIARY SPECTACLES

(76) Inventor: Gao Yong, Room 2605, HuaSheng Tower, JieFang South Street, WenZhou, Zhejiang province, 325000 (CN)

( * ) Notice: Subject to any disclaimer, the term of this patent is extended or adjusted under 35 U.S.C. 154(b) by 65 days.

(21) Appl. No.: 11/496,437

(22) Filed: Aug. 1, 2006

(65) Prior Publication Data
US 2007/0121057 A1 May 31, 2007

(30) Foreign Application Priority Data
Nov. 30, 2005 (CN) .................... 2005 1 0126129

(51) Int. Cl.
*G02C 9/00* (2006.01)
(52) U.S. Cl. .............. 351/47; 351/48; 351/57; 351/58
(58) Field of Classification Search .......... 351/47, 351/57, 48, 58, 44, 41, 158, 124, 128
See application file for complete search history.

(56) References Cited
U.S. PATENT DOCUMENTS
5,953,096 A * 9/1999 Friedman .................... 351/47
6,779,886 B2 * 8/2004 Huang ........................ 351/47

\* cited by examiner

*Primary Examiner*—Hung X Dang
(74) *Attorney, Agent, or Firm*—Harness, Dickey & Pierce, P.L.C.

(57) ABSTRACT

A auxiliary spectacles provided with a clamping mechanism includes a mechanism body, onto the ends of which the auxiliary spectacles lenses are mounted. The mechanism body between the two lenses of the auxiliary spectacles may be provided with an elastic pushing clamping body. The elastic pushing clamping body may include a bending foot body provided with at least one bending foot extending backward and then bending downwardly is fixed to the mechanism body, and the mechanism body may be provided with a pushing slider which may be pressed elastically, and the rear end of the pushing slider may be pushed elastically against the inner sidewall of the bending foot. The auxiliary spectacles may be used, assembled and disassembled more easily, and/or clamped more firmly; and may be compatible with other kinds of spectacles without adjustment.

30 Claims, 20 Drawing Sheets

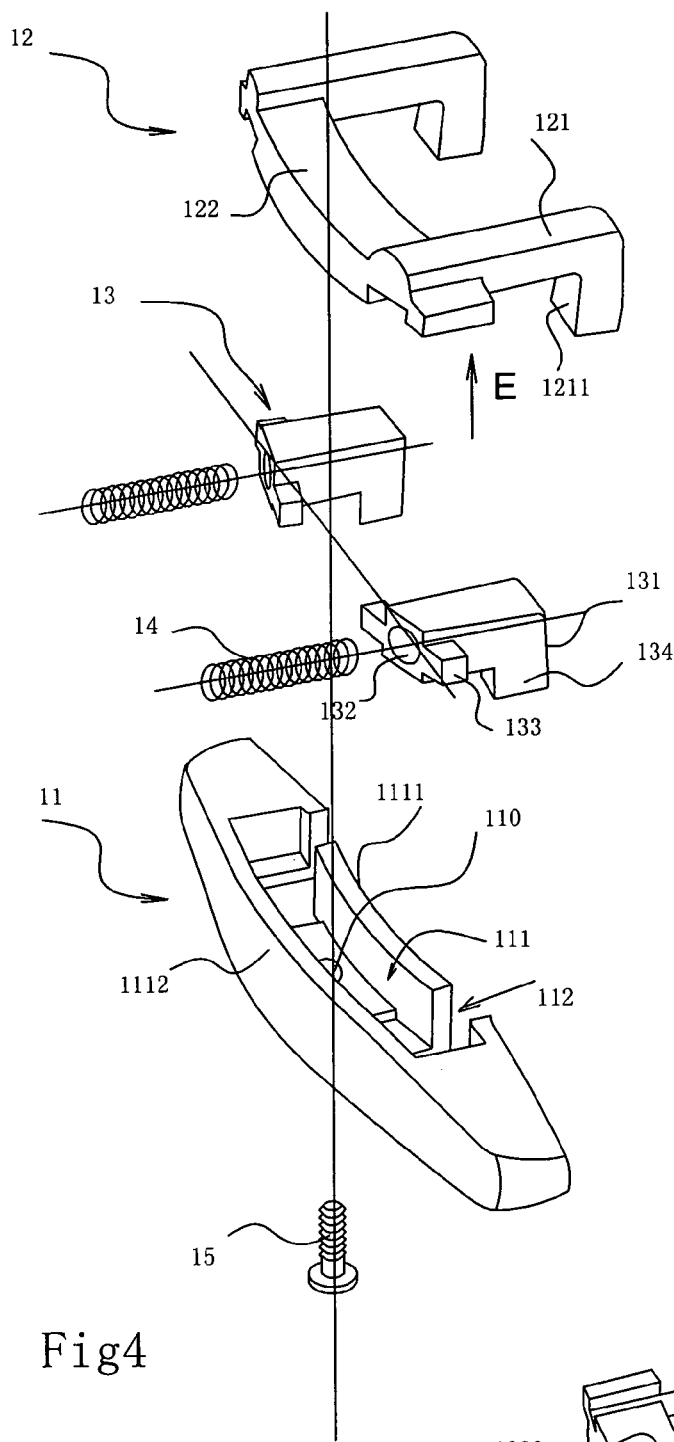
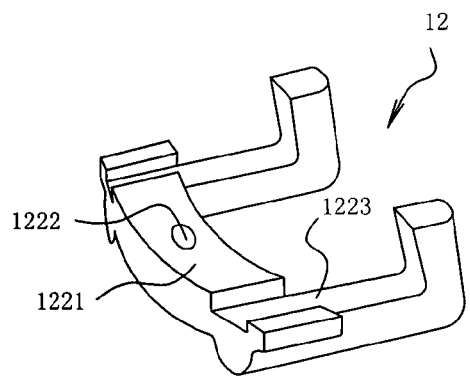
Fig4
Fig5

AUXILIARY SPECTACLES

PRIORITY STATEMENT

This Non-provisional application claims priority under 35 U.S.C. §119(a) on patent application Ser. No(s). 200510126129.8 filed in P.R. China on Nov. 30, 2005, the entire contents of which are hereby incorporated by reference.

FIELD

Example embodiments relate to auxiliary spectacles mountable on optical spectacle frames.

BACKGROUND ART

At present, double-layer spectacles formed by mounting auxiliary spectacles on spectacle frames with bottom spectacle lenses are available in the market, with the auxiliary spectacles mounted to the bottom spectacles through magnets or through a concave convex mechanism. Conventional spectacles and auxiliary spectacles are sold in sets, and one kind of auxiliary spectacles can only fit with one kind of bottom spectacles, which leads to complicated structures, low interchangeability, inconvenient usage and troublesome carriage.

SUMMARY

Example embodiments provide auxiliary spectacles with a simple structure, which are easy to use, assemble and disassemble, and may match all kinds of spectacles.

In example embodiments, auxiliary spectacles provided with a clamping mechanism may comprise a mechanism body, onto the ends of which the auxiliary spectacle lenses are mounted. The mechanism body between the two lenses of the auxiliary spectacles may be provided with an elastic pushing clamping body.

In an example embodiment, the elastic pushing clamping body may include a bending foot body provided with at least one bending foot extending backward and then bending downward that is fixed to the mechanism body, and the mechanism body may be provided with a pushing slider which may be pressed elastically. The rear end of the pushing slider is pushed against the inner sidewall of the bending foot.

According to example embodiments, the auxiliary spectacles may be mounted to the bottom lenses by clamping the elastic pushing clamping body on a middle bridge of the bottom spectacles, so as to make the auxiliary lenses at both ends of the elastic pushing clamping body and the bottom lenses double-layer lenses.

According to an example embodiment, the elastic slider is pushed inward to clamp the middle bridge of the bottom spectacles between the pushing slider and the bending foot, so as to make the auxiliary lenses at both ends of the mechanism body and the two bottom lenses double-layer lenses.

The auxiliary spectacles with a simple structure according to example embodiments may be used, assembled and disassembled easily, and/or clamped firmly; are compatible with other kinds of spectacles without adjustment.

BRIEF DESCRIPTION OF THE DRAWINGS

The above and other features of example embodiments will become readily apparent by from the description with reference to the attached drawings in which:

FIG. 4 is the schematic structural diagram in D direction of FIG. 3 in exploded state (in which auxiliary lenses and connecting member are omitted).

FIG. 5 is the schematic structural diagram of bending foot body in E direction as shown in FIG. 4.

DESCRIPTION OF EXAMPLE EMBODIMENTS

Example embodiments will now be described more fully with reference to the attached drawings.

Figure 1:
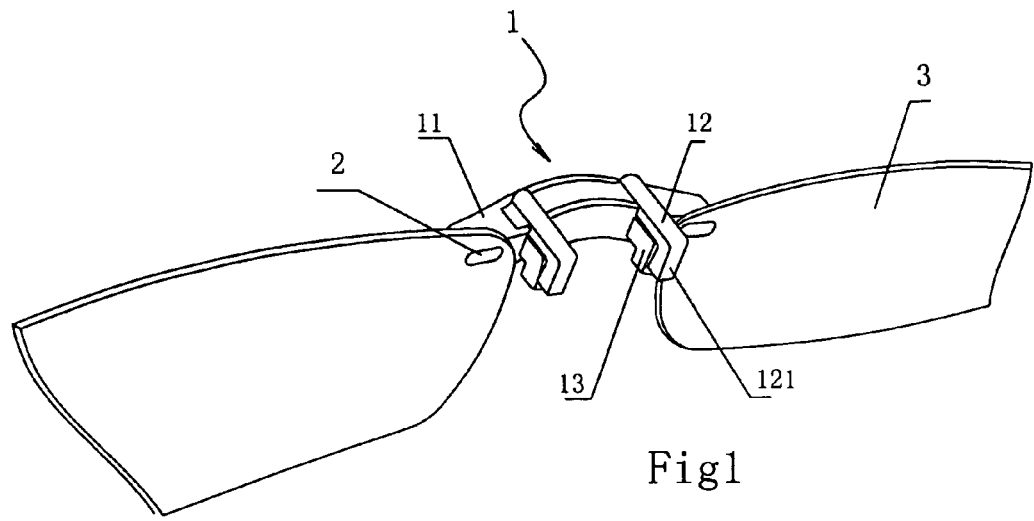
FIG. 1 is the schematic structural diagram of an example embodiment.
Figure 2:
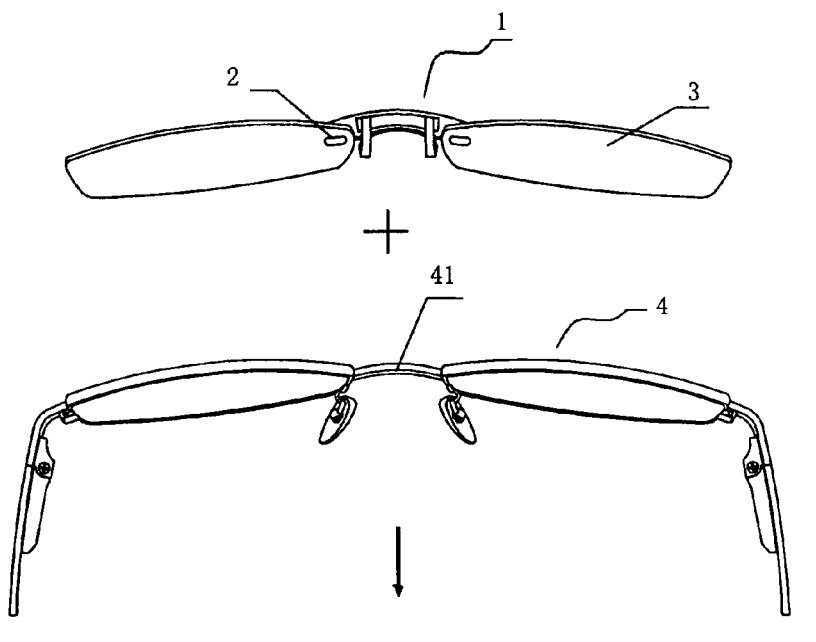
FIG. 2 is the schematic diagram of clamping and hanging on the middle bridge 41 of the bottom spectacle frames of FIG. 2.
Figure 2:
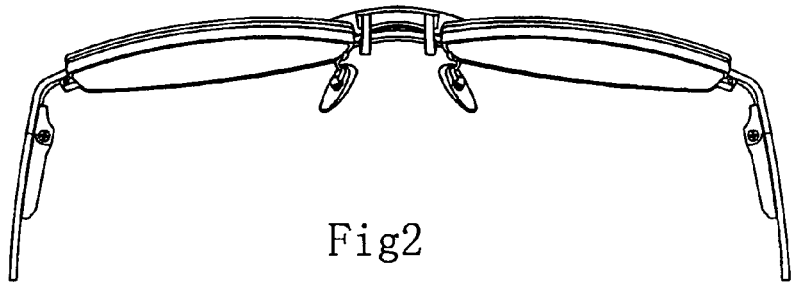
Figure 3:
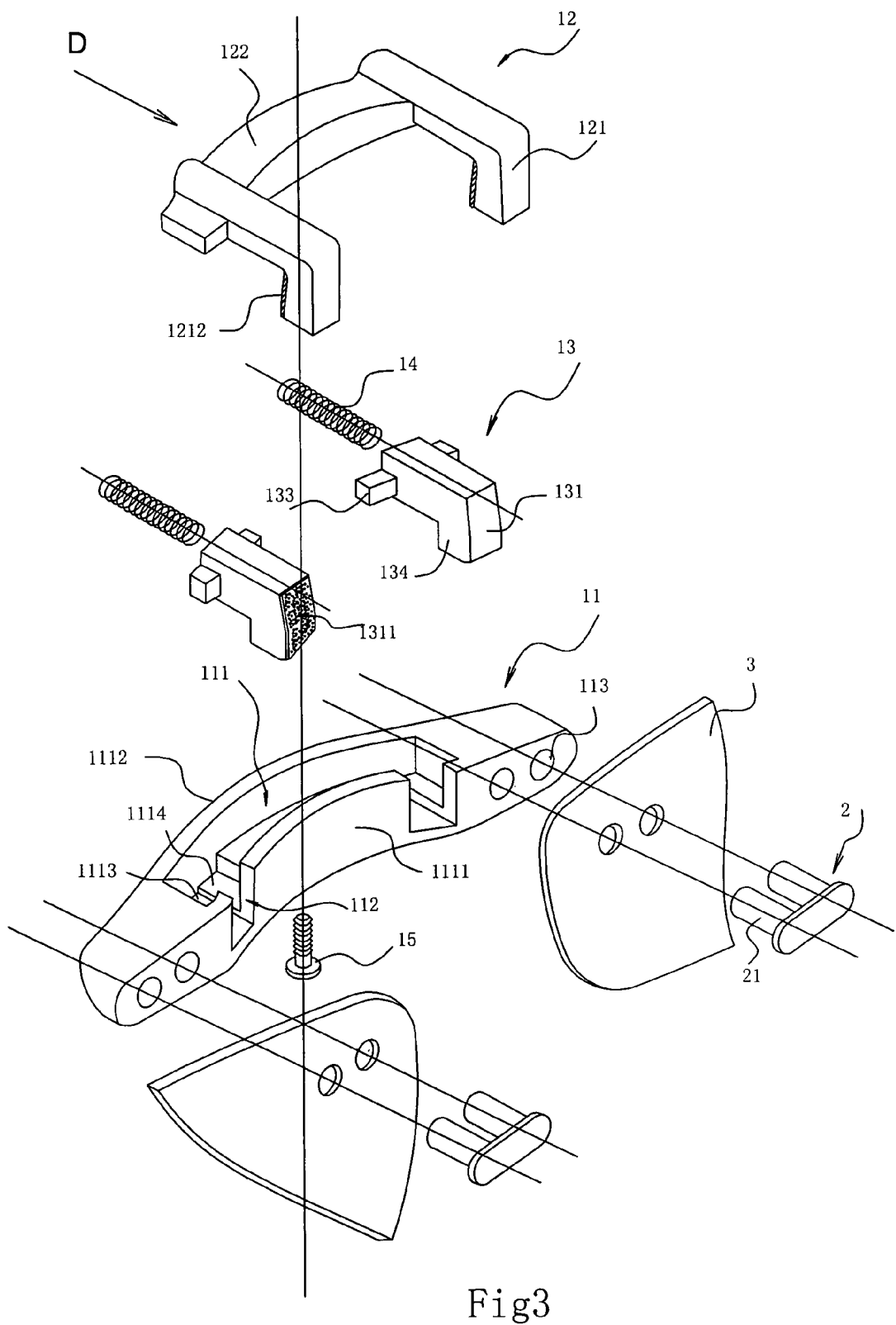
FIG. 3 is the exploded schematic structural diagram of FIG. 2.

Referring to FIG. 3, the mechanism body 11 may be connected with auxiliary spectacle lenses 3 on both sides through connecting members 2. For example, holes 113 may be provided in sidewalls on both ends of the mechanism body 11, and at least one connecting column 21 is provided on a connecting member 2. The connecting columns 21 pass through the positioning hole in the auxiliary spectacle lenses 3 and are inserted into hole 113 of the mechanism body 11 so as to be connected with the mechanism body, and thus the auxiliary spectacle lenses 3 are fixed to the mechanism body 11 (the other end of the connecting column 21 is against the auxiliary spectacle lenses through step located in the conjoining part thereof with the connecting member).

The connecting columns 21 of the connecting member may be inserted into the holes 113 of the mechanism body and adhere to it.

Two connecting columns 21 may be arranged on the connecting member in an example embodiment, which go through positioning holes in the auxiliary spectacle lenses 3 and are inserted into holes 13 of the mechanism body 11 so as to be adhered to the mechanism body. Thus the auxiliary spectacle lenses may be fixed firmly to the mechanism body.

The two connecting columns 21 on said connecting member 2 may be aligned horizontally ('horizontally' refers to the connecting direction of the two lenses).

The pushing slider 13 and bending foot body 12 may be mounted on the mechanism body directly, referring to FIGS. 3, 4 and 5. The recessed slot 111, the rear portion of which is provided with openings 112, is arranged on the top end face of the mechanism body 11. The bending foot body 12 has bending feet 121 extending from the top cover 122 and then bending downward. The bending foot body 12 is fastened to the upper opening of the slot 111 by the top cover 122. The rear portion of the pushing slider 13 positioned in the slot 111 of the mechanism body passes through the opening 112 and is pushed elastically against the inner sidewall 1211 of the mechanism body 11 because of the elastic force produced by the elastic member 14.

The openings 112 may be formed by cutting downwardly from the top end face of the rear sidewall 1111 of the slot 111. The pushing slider 13 passes through the openings 112 and slide into the slot 111. The elastic members 14 are mounted between the front ends of the pushing sliders and the front sidewall 1112 of the slot 111.

An opening 132 may be formed in the front-end face of the pushing slider 13 (see FIG. 4). The front end of the elastic member 14, which may be a spring, is pushed against the front sidewall 1112 of the slot while the rear end of the spring is inserted into the opening 132 of the pushing slider 13 and pushed against the pushing slider. Thus, the pushing slider 13 and the bending foot 121 may form an elastic pushing clamping body.

Figure 7:
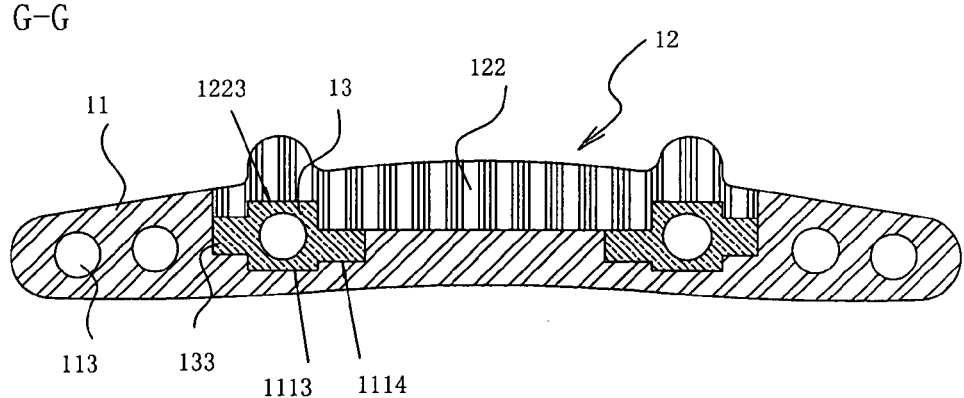
FIG. 7 is the schematic cross-section view of the slide fitting structure of the pushing slider, the bending foot body and the mechanism body slidingly in G-G direction of FIG. 6.

Referring to FIG. 3, a guiding slot 1113 extends from the bottom of the opening 112 in the rear sidewall to the bottom of front sidewall 1112 is arranged in the bottom of the slot 111. The pushing slider 13 slides into the guiding slot 1113. A locking block 133 protrudes from the sidewall of the pushing slider 13 and slides with the guiding face 1114 between the side portion of the guiding slot 1113 and the upper bottom of the slot 111. Referring to FIGS. 3 and 7, the guiding face 1114 for the locking block may be step face.

The locking blocks 133 protruded from the side portion may be arranged on both sidewalls of the pushing slider 13 in an example embodiment and slide with the guiding face 1114 arranged on both sides of the guiding slot 1113 respectively.

The locking blocks 133 may be arranged near the front end of the pushing sliders 13.

A bending body 134 with the angle of 90 degrees may be arranged on the rear end of the pushing slider 13, and the holding area between the rear end and the bending foot 121 may be enlarged to hold the middle bridge 41 of the bottom spectacle frames more firmly.

Elastic material layers 1311 and 1212 may be arranged on the holding face between the rear end of the pushing slider 13 and the inner sidewall of the bending foot 121 (see FIG. 3, with the elastic material layer not shown in all the figures) to enhance the friction for holding the middle bridge. The elastic material layers 1311 and 1212 may also be helpful for the holding of the middle bridge of the spectacle frames in different shapes and also provide the function for protecting the middle bridge of the spectacle frames.

The top cover 122 of the bending foot body 12 may be embedded into the upper opening of the slot 111 of the mechanism body while the bottom surface of the top cover 122 touches with the upside surface of the pushing slider 13.

Figure 6:
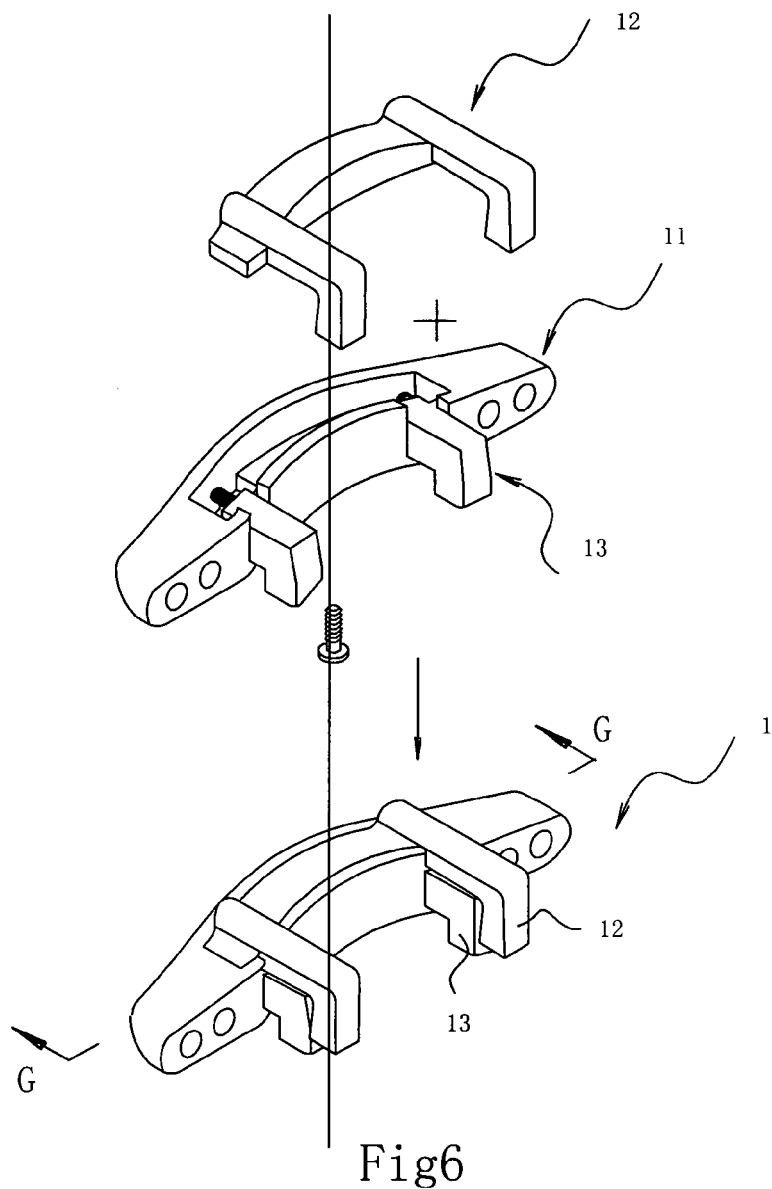
FIG. 6 is the schematic mating structural diagram of bending foot body and the mechanism body of FIG. 1.

A groove may be formed in downside wall 1221 of the top cover and may have the same plane 1223 with the downside horizontal wall of the bending foot 121 in an example embodiment (see FIG. 6). The plane 1223 is fitted with the upside surface of the pushing slider 13 slidingly (see FIG. 7) and the distance between the downside surface of the top cover and the upside surface of the pushing slider may be adjusted by a locking member 15 with a screwed connection between the mechanism body and the bending foot body.

Two pushing sliders 13 being pushed elastically against the sidewalls of the mechanism body may be aligned horizontally with the mechanism body, and may be pushed against the inner sidewall of the bending foot 121 of the bending foot body 12 by the elastic force of the elastic member 14.

Two openings 112 may be formed in the rear sidewall of the slot 111 in the mechanism body. Two pushing sliders 13 slide through the openings and are pushed against the inner sidewall of the bending foot 121 of the bending foot body 12 by the elastic force of the elastic member 14. Two bending feet 121 extend from the top cover and then bend downward. The corresponding inner sidewall of each bending foot 121 is pushed against elastically by the two pushing sliders 13 respectively.

In order to hold the middle bridge 41 of the bottom spectacle frames more firmly, two elastic pushing sliders may be arranged.

The locking member 15 passes through the positioning hole 110 in the bottom of the slot and the positioning hole 1222 in the top cover of the bending foot body to connect the bending foot body with the mechanism body. In an example embodiment, the locking member 15 may be screwed to the positioning hole 1222.

The locking member 15 may be arranged in the center portion of the mechanism body.

In an example embodiment, the pushing slider 13 which is pushed against the bending foot 121 elastically by the elastic force of the elastic member 14 may slide along the opening 112 in the rear sidewall of the mechanism body, guiding slots 1113, 1114 in the bottom of the cavity in the slot, while guiding slots 1113 limit the movement of the pushing sliders 13 in the left and right direction and the top cover 122 of the bending foot body limit the movement of the pushing sliders 13 in the up and down direction (see FIG. 7).

Figure 8:
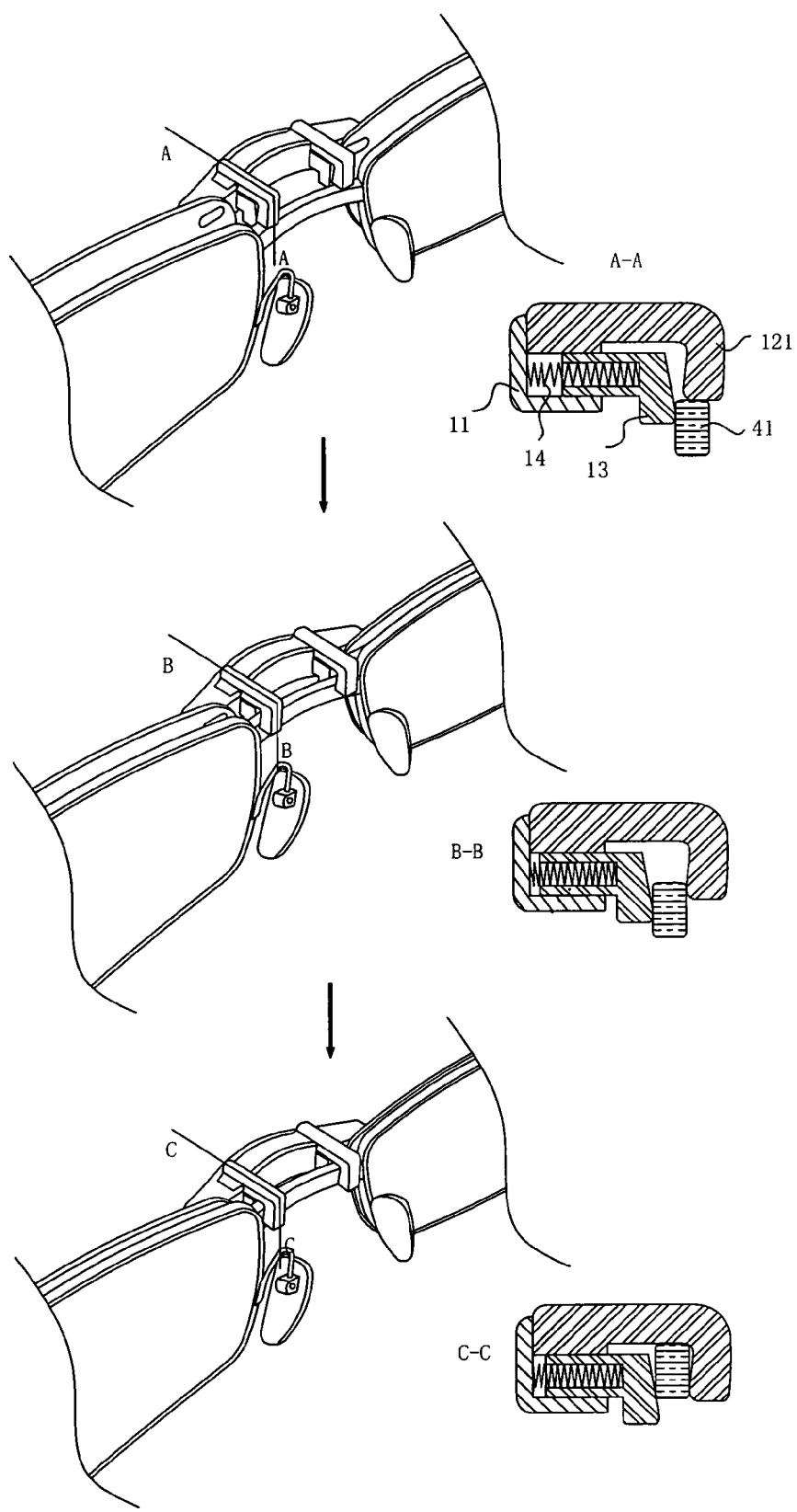
FIG. 8 is the schematic process diagram of the elastic pushing clamping body clamping and hanging on the middle bridge of the bottom spectacle frames of FIG. 1.

FIG. 8 shows the schematic process diagram of holding the middle bridge 41 of the bottom spectacle frames with the elastic pushing clamping body in an example embodiment, i.e., the pushing slider 13 and the bending foot 121 of the bending foot body.

This example embodiment may have the advantages of simple and compact structure, convenient handling, and capability of matching all kinds of spectacles without adjustment.

Figure 9:
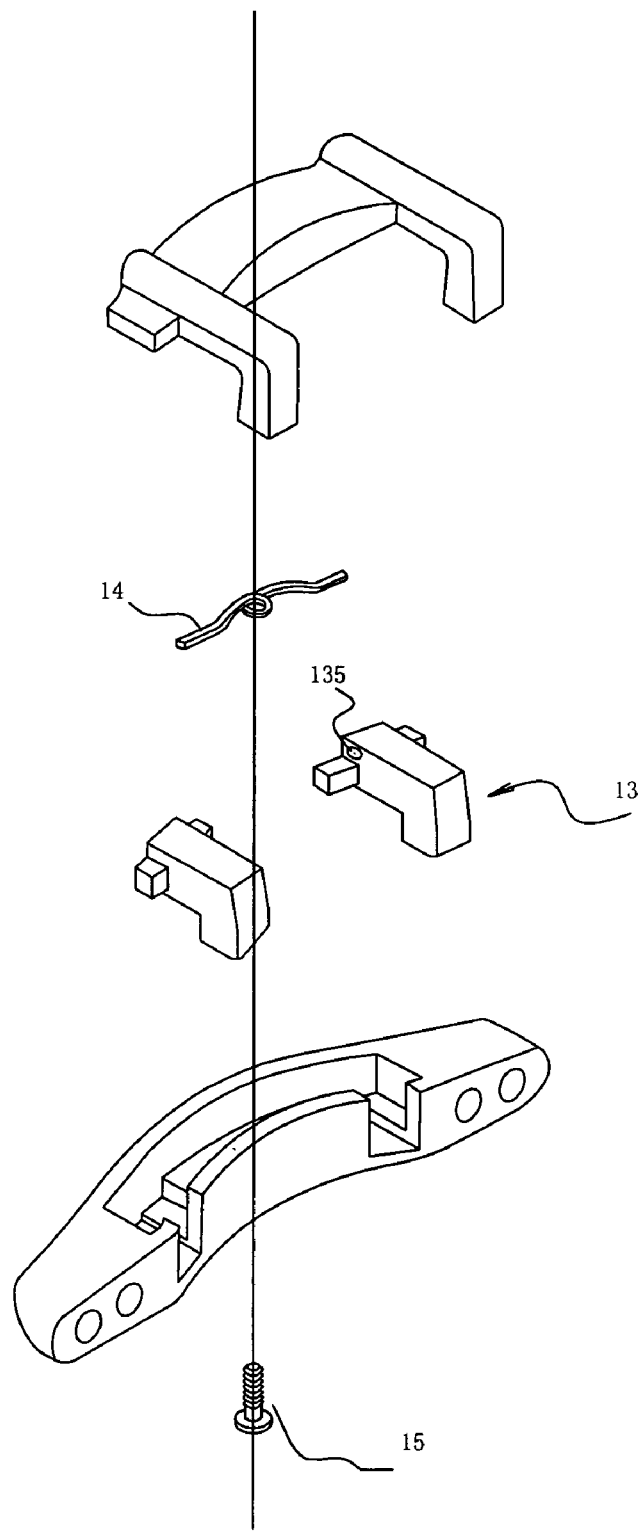
FIG. 9 is the exploded schematic structural diagram of the elastic pushing clamping body of an example embodiment. (in which auxiliary lenses are omitted)
Figure 10:
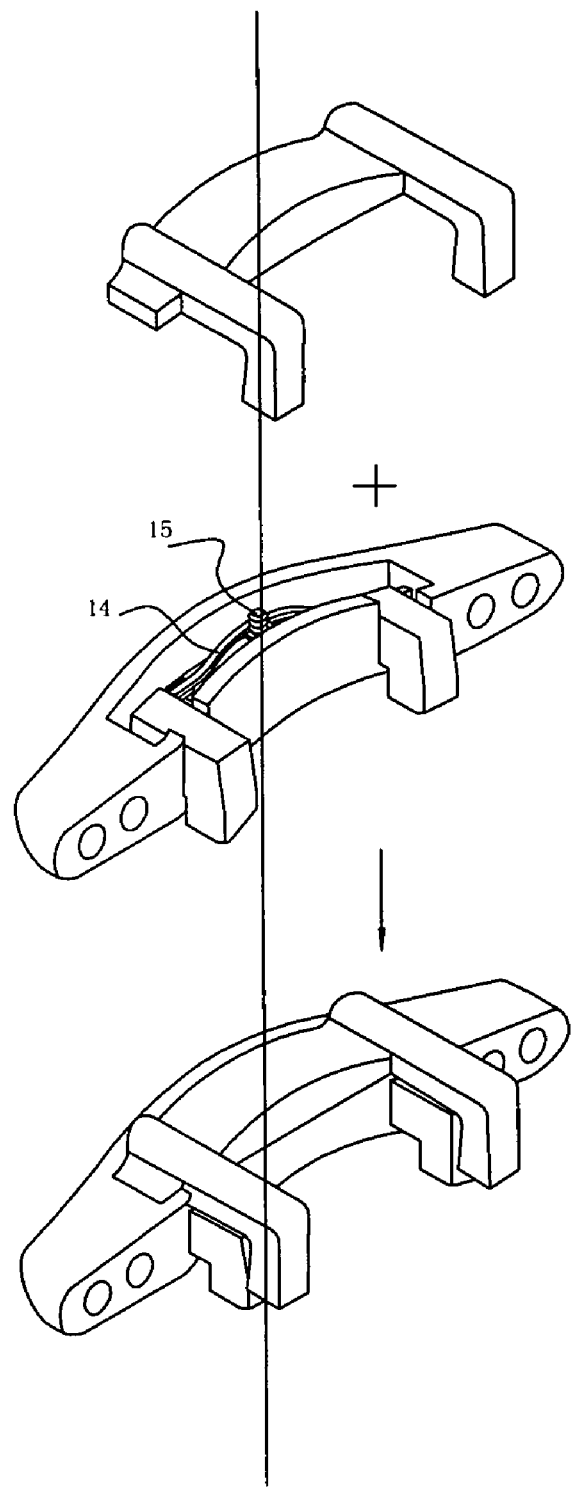
FIG. 10 is the schematic mating structural diagram of bending foot body and the mechanism body of FIG. 9.

Referring to FIGS. 9 and 10, in another example embodiment, the elastic member 14 may be a torsion spring, and the end of the two torsion arms of the torsion spring may be connected with the pushing sliders 13 on the left and right side.

In an example embodiment, the end of the two torsion arms of the torsion spring 14 may be inserted into the positioning holes 135 in the left and right sidewalls of the pushing slider respectively.

The locking member 15 may pass through the positioning hole in the bottom of the slot and the positioning hole in the top cover of the bending foot body to connect the bending foot body with the mechanism body, while the torsion ring in the middle of the torsion spring 14 is around the locking member 15 located in the middle portion of the mechanism body.

Figure 11:
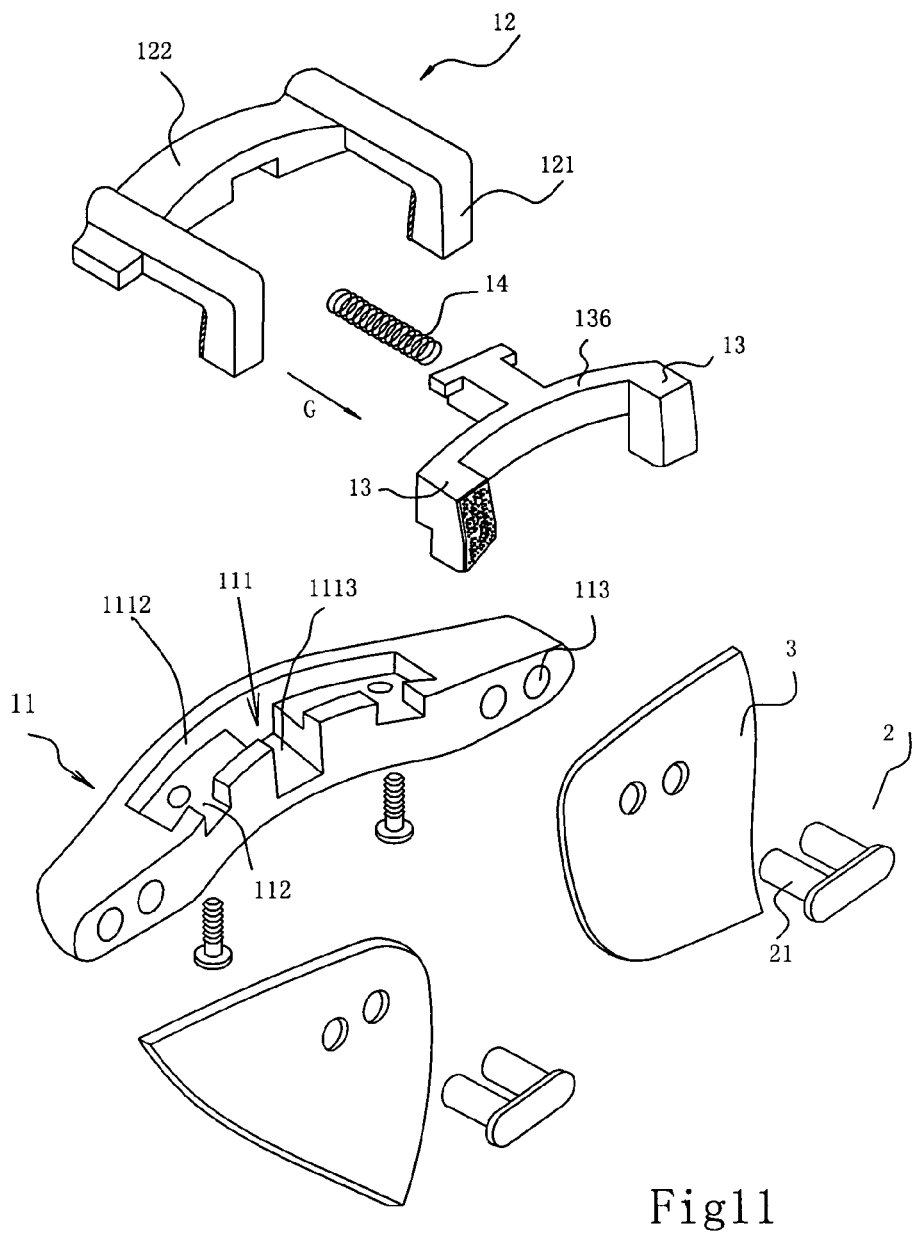
FIG. 11 is the exploded schematic structural diagram of an example embodiment.
Figure 12:
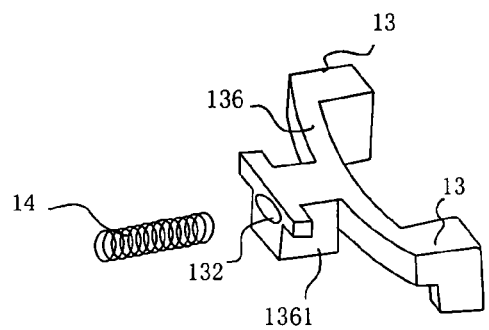
FIG. 12 is the schematic structural diagram of pushing slider in G direction of FIG. 11.

Referring to FIGS. 11 and 12, in an example embodiment, an recessed slot 111 which is provided with two openings 112 in the rear sidewall may be formed in the upside face of the mechanism body 111. The bending foot body 12 having two bending feet 121 being bent backward and then downward from the top cover is fastened into the upper opening of the slot 111. Two pushing sliders 13 pass through the two openings 112 in the rear sidewall of the slot respectively, and an elastic member 14 may be arranged between the front end of the pushing slider and the front sidewall 1112 of the slot 111, while the rear end of the pushing slider is pushed against the inner sidewalls 1211 of the bending feet of the bending foot body elastically.

The front ends of the two pushing sliders 13 may be connected integrally with a crossbeam of the pushing slider 136 in the slot 111 and an elastic member 14 may be arranged between the crossbeam 136 of the pushing slider and front sidewall 1112 of the slot 111.

An opening 132 may be formed in the front end-face of the crossbeam 136 of the pushing slider. The elastic member 14 may be a spring. The front end of the spring is pushed against the front sidewall 1112 of the slot, and the rear end of the spring is inserted into the opening 132 formed in the front-end face of the crossbeam 136 of the pushing slider to push against the pushing slider due to the elastic force of the pushing slider.

The opening 132 may be formed in the middle portion of the front-end face of the crossbeam 136 of the pushing slider.

In an example embodiment, a guiding slot 1113 in front-rear direction may be formed in the bottom of the slot 111. A downward convex 1361 is formed on the bottom of the crossbeam 136 of the pushing slider and is fitted into the guiding slot 113 slidingly. The convex 1361 is formed in the middle portion of the crossbeam of the pushing slider 136.

Figure 13:
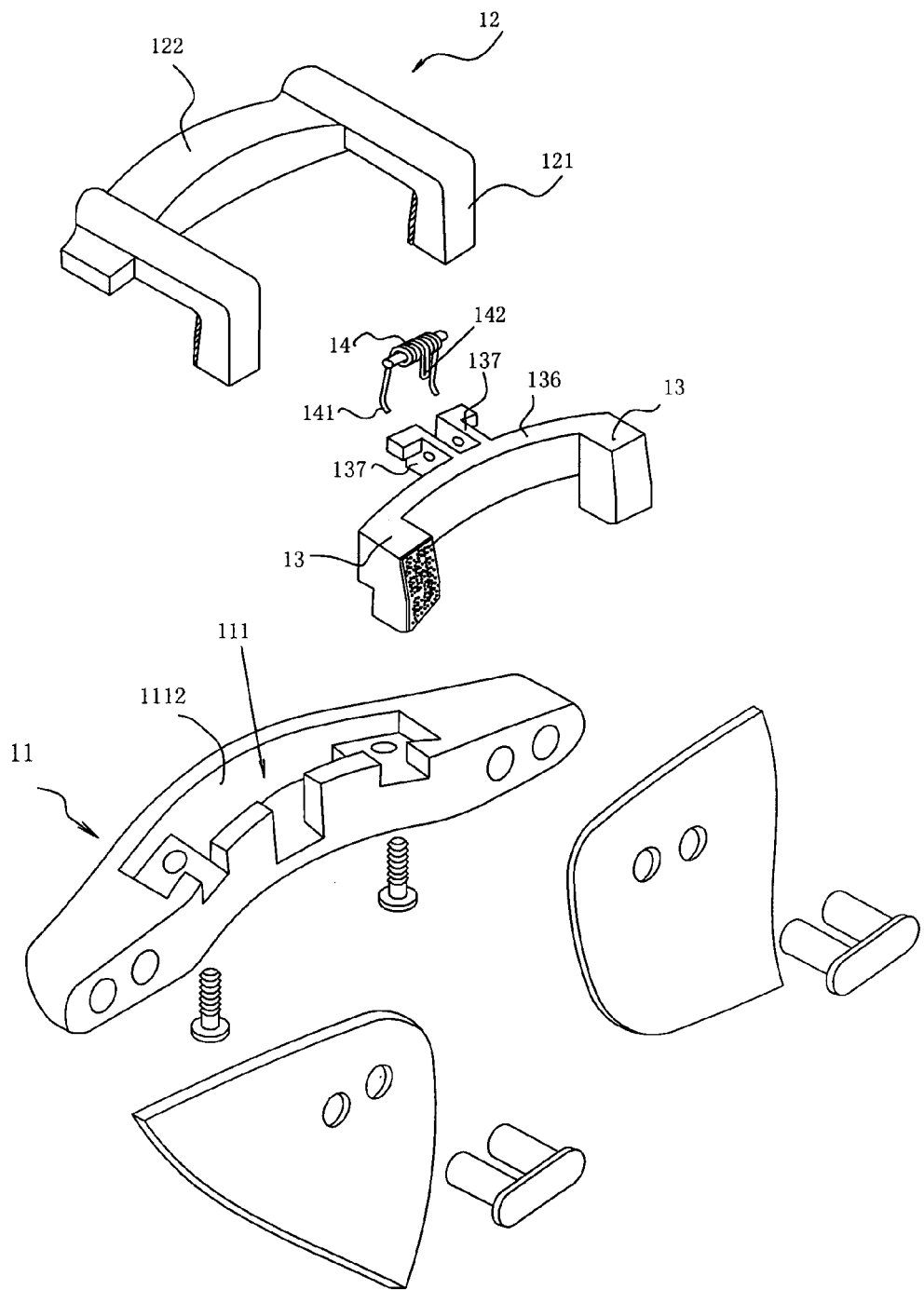
FIG. 13 is the exploded schematic structural diagram of an example embodiment.

Referring to FIG. 13, in an example embodiment two extension walls 137 may be arranged in the front portion of the crossbeam 136 of the pushing slider, and the elastic member 14 may be a torsion spring with three feet being arranged around the axis between the two extension walls. The two foot ends 141 and the middle end 142 of the torsion spring with three feet act on the crossbeam 136 of the pushing slider and the front sidewall 1112 of the slot respectively to force the rear end of the pushing slider 13 to be elastically pushed against the inner sidewall 1211 of the bending feet being bent downward of the bending foot body by the spring force of the torsion spring.

Figure 14:
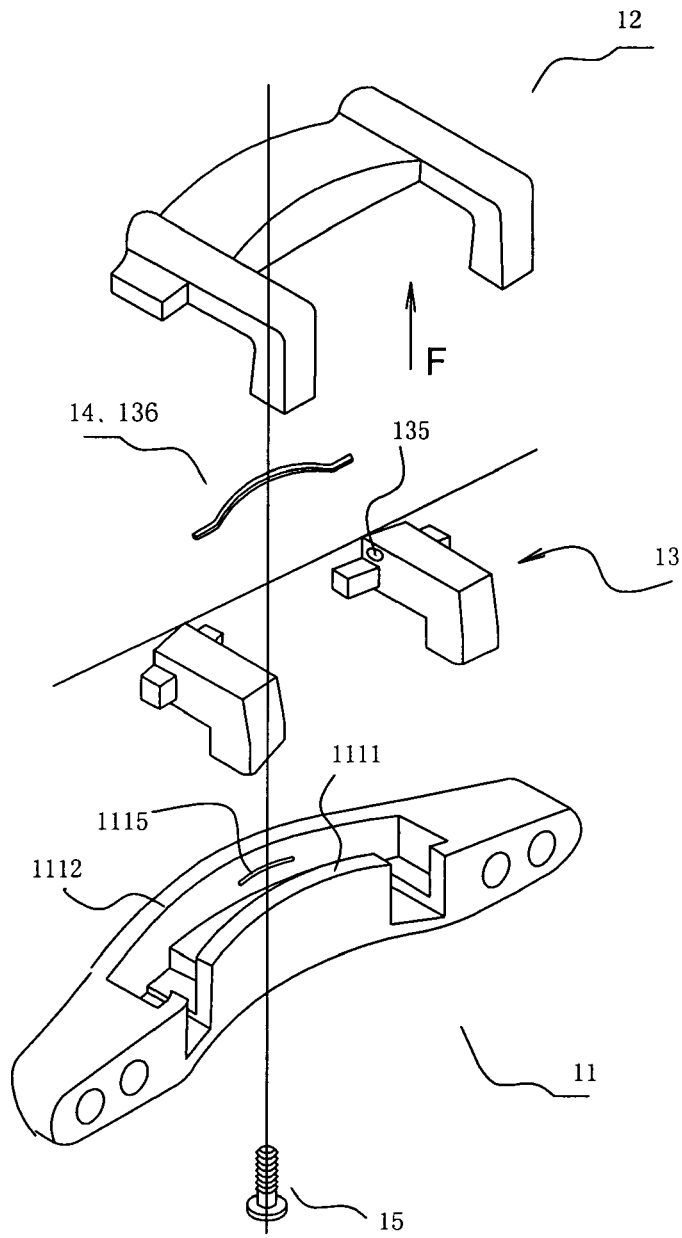
FIG. 14 is the exploded schematic structural diagram of an example embodiment (in which auxiliary lenses are omitted).
Figure 15:
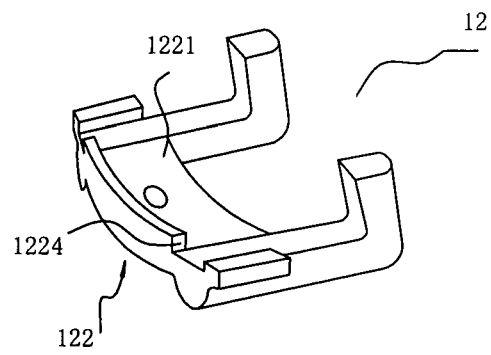
FIG. 15 is the schematic structural diagram of bending foot body in F direction of FIG. 14.
Figure 16:
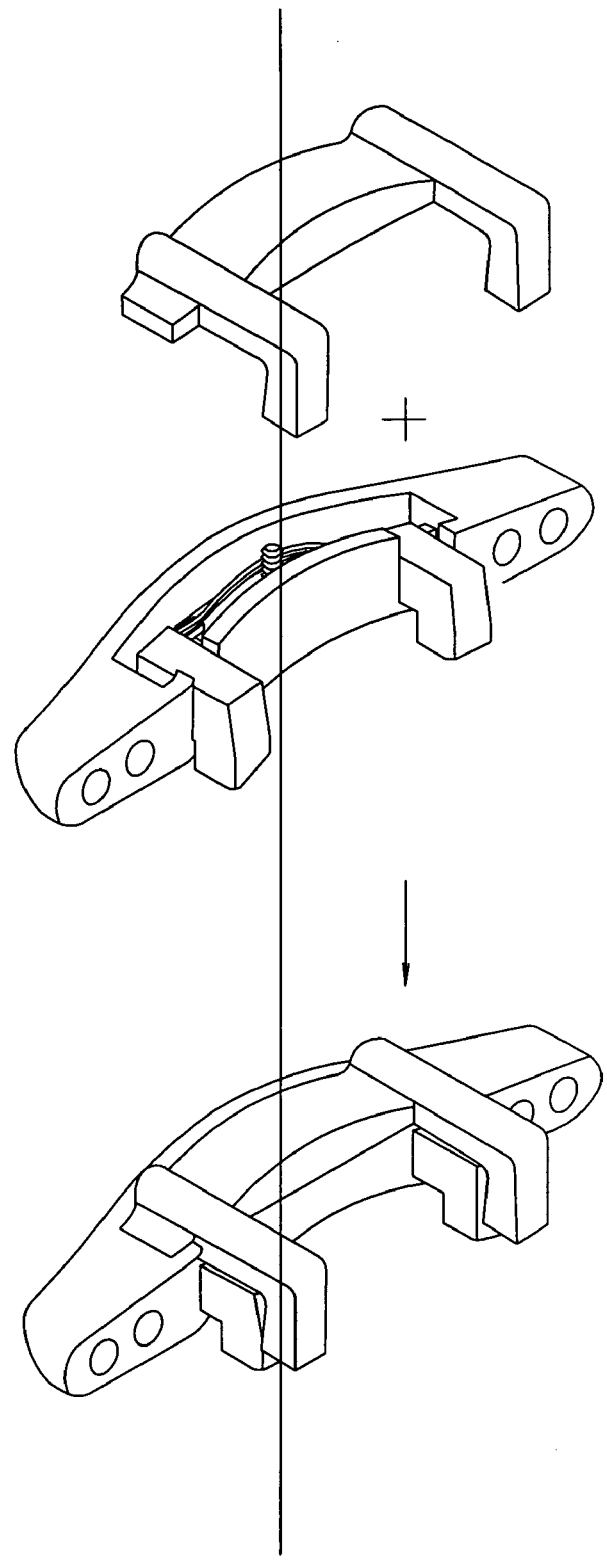
FIG. 16 is the schematic mating structural diagram of bending foot body and the mechanism body of FIG. 14.

Referring to FIGS. 14, 15 and 16, in an example embodiment the crossbeam 136 of the pushing slider may be the elastic member 14 which may be a long strip-shaped elastomer and may push against the front sidewall 1112 of the slot by the protrusive portion thereof.

Positioning holes 135 may be arranged in the opposite inner sidewalls of the left and right pushing sliders 13. The elastic member 14 acting as the crossbeam 136 of the pushing slider protrudes forward in the middle portion and has the both ends inserted into the positioning holes 135 in the pushing slider on both sides respectively. A recessed positioning slot 1115 may be formed in the front sidewall of the slot 111 so that the front portion of the elastic member is inserted into the recessed positioning slot 1115. The elastic member 14 pushes the pushing slider 13 against the inner sidewall of the bending foot 121 due to the elastic force of the elastic member.

Further, the front portion of the elastic member may be inserted into the positioning slot 115 to thereby limit the movement of the elastic member in the up and down direction.

The front sidewall of the top cover 122 of the bending foot body with an extension wall 1224 downward together with the left and right sidewalls thereof are embedded into the upper opening of the slot 111, while the downside wall face of the top cover is laid over the upside face of the rear sidewall 1111 of the slot.

Figure 17:
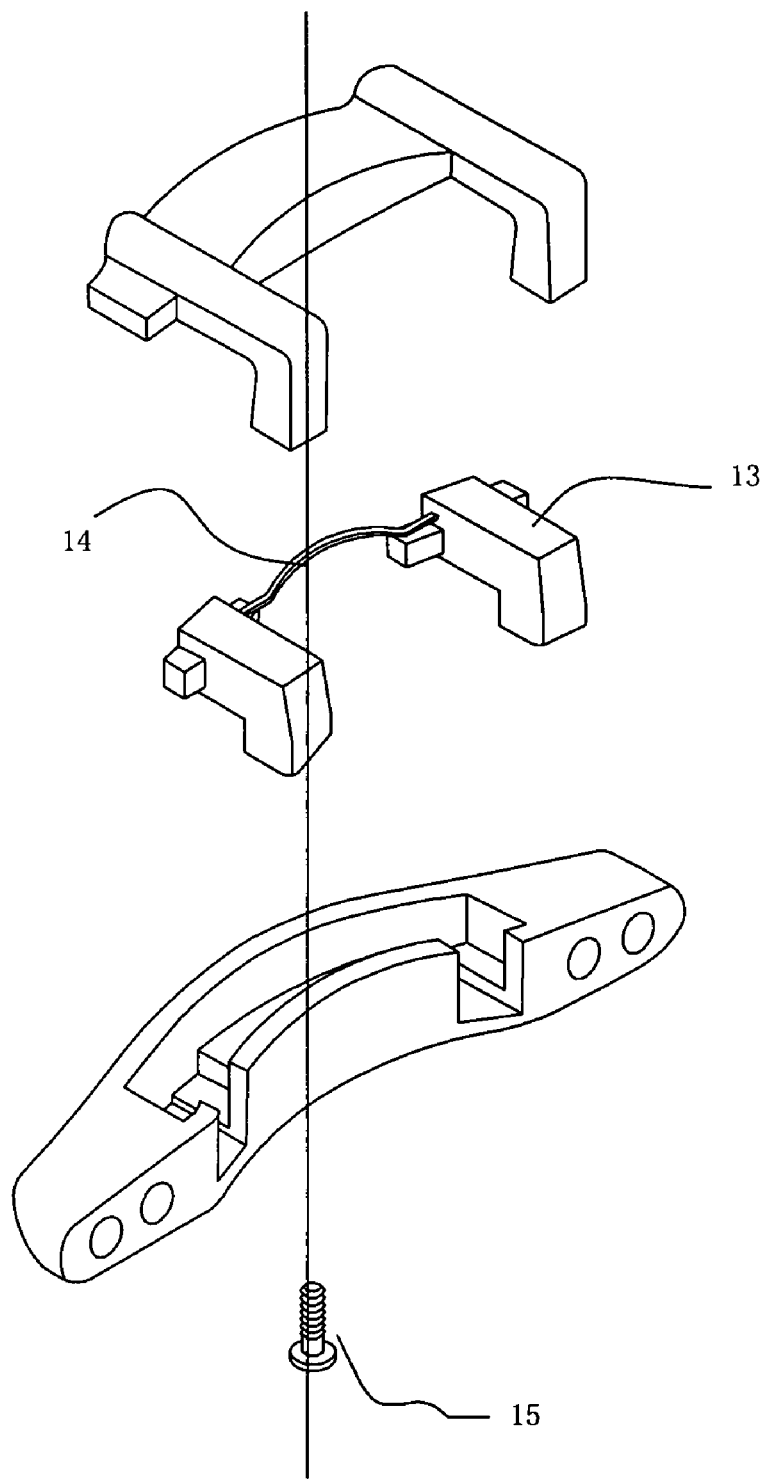
FIG. 17 is the exploded schematic structural diagram of an example embodiment (in which auxiliary lenses 3 are omitted).
Figure 18:
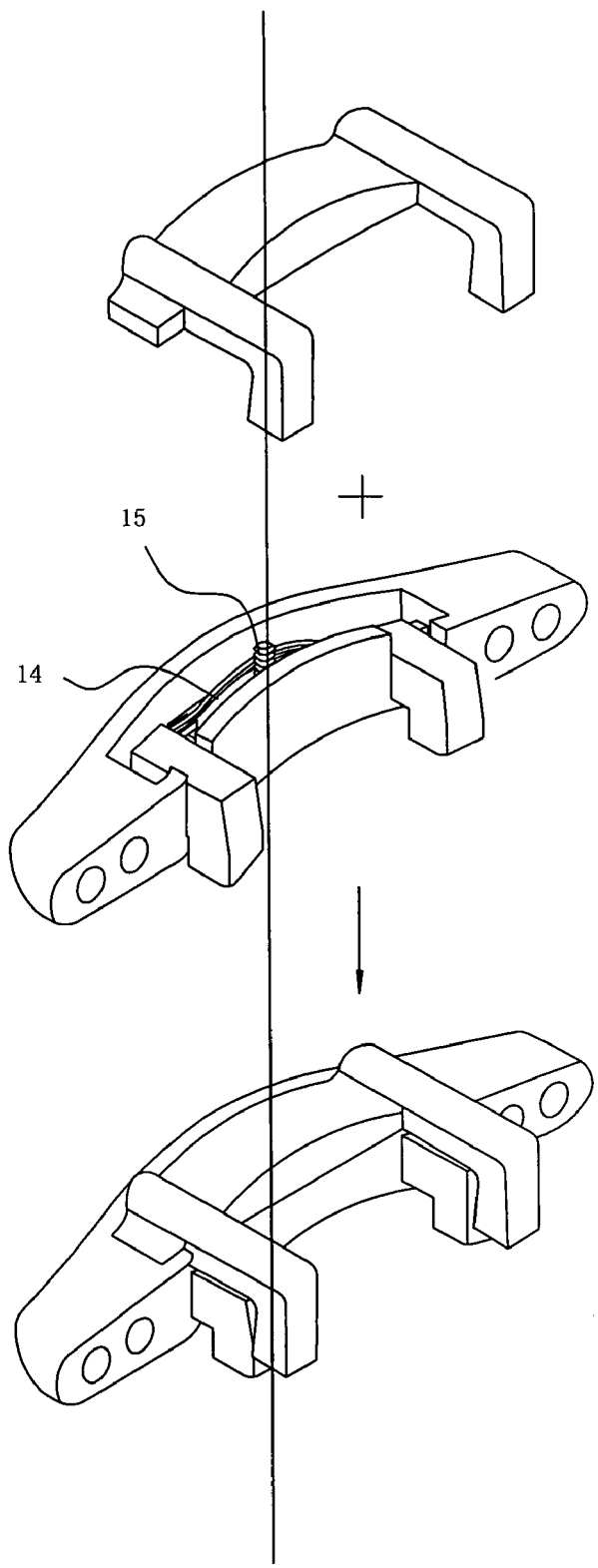
FIG. 18 is the schematic mating structural diagram of bending foot body and the mechanism body of FIG. 17.

Referring to FIGS. 17 and 18, in an example embodiment, the elastic member 14 acting as the crossbeam 136 of the pushing slider may be made of elastic materials and integrally formed with the pushing sliders 13 on both sides. The protruding portion is pushed against the front sidewall 1112 of the slot and thus forces the pushing sliders 13 to be elastically pushed against the inner sidewall of the bending foot 121 due to the elastic force of the elastic member 14. The integral structure of the elastic member and the pushing slider with U-shape may be formed by die-casting and located in the slot of the mechanism body.

In the above-mentioned example embodiments, the bending foot body 12 and the pushing slider 13 may be directly mounted on the mechanism body 11. In the following example embodiments, they may be mounted on an embedding block 115 which is embedded into the embedding hole 116 formed in the mechanism body 11.

The embedding block 115 may be embedded into the embedding hole 16 which may be formed in the mechanism body 11 and match with the embedding block 115 in the profile by means of supersonic wave or locking directly, so as to be integral with the mechanism body.

The mechanism body 11 may be integral with the spectacle frame of the auxiliary spectacle lenses 3 on both sides in an example embodiment.

Figure 19:
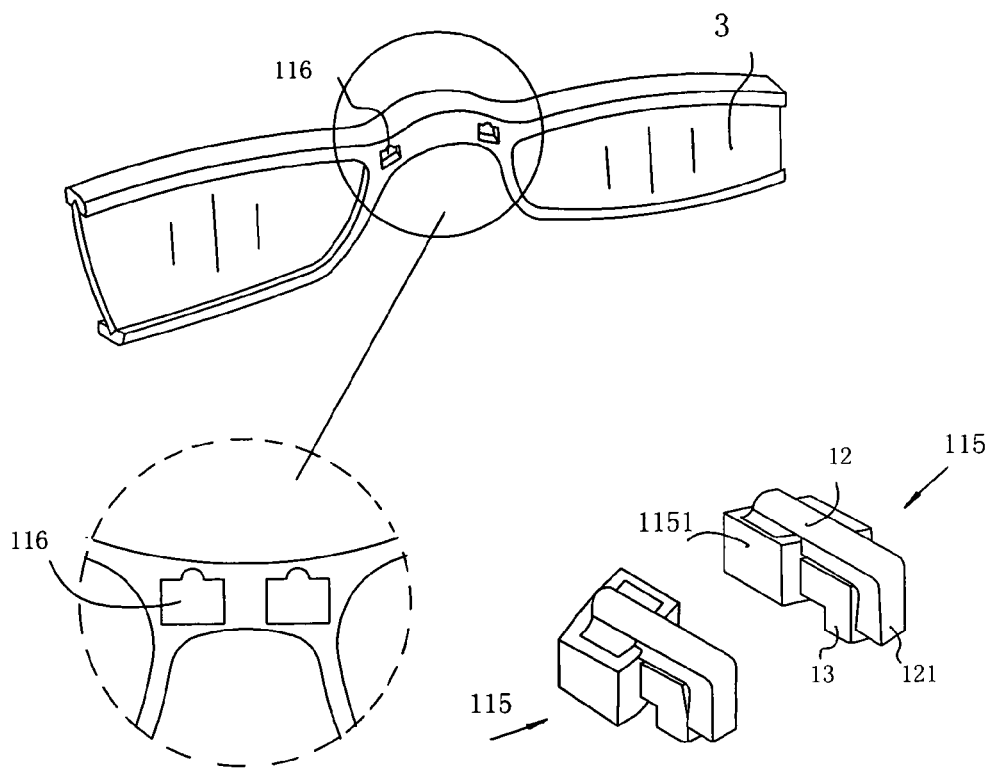
FIG. 19 is the schematic structural diagram of an example embodiment.
Figure 20:
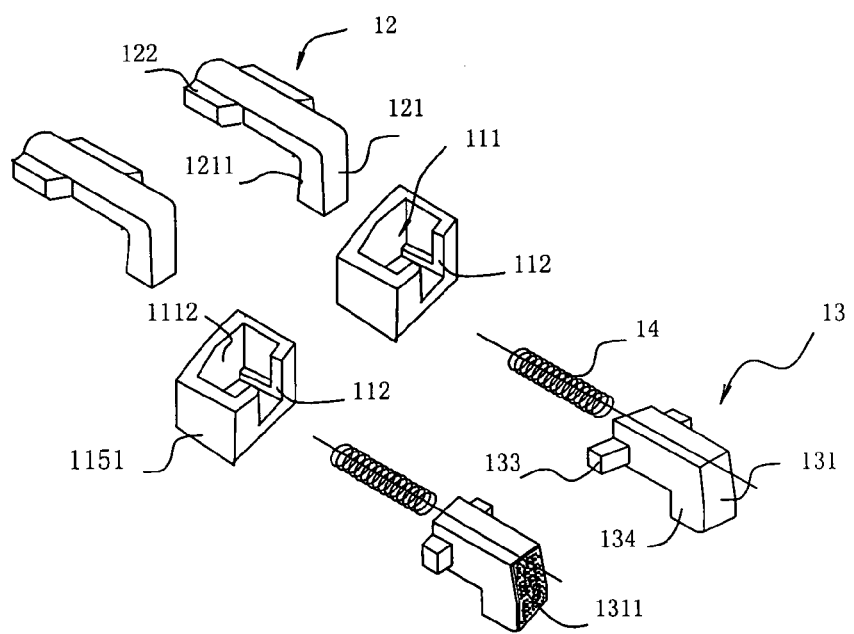
FIG. 20 is the exploded structural diagram of the embedding block of FIG. 19.

Referring to FIGS. 19 and 20, in an example embodiment, the bending foot body 12 and the pushing slider 13 may be mounted on the embedding block 115. Two embedding blocks with the bending foot body 12 and the pushing slider are respectively embedded into two embedding holes 16 which are formed in the mechanism body 11 along the horizontal direction. The structure of the bending foot body 12 and the pushing slider 13 being mounted on the embedding block 115 may be the same as in FIGS. 1-8. The embedding block 115 may be provided with an assembling block 1151, in the upper end face of which a recessed slot 111 is arranged and in the rear portion of which an opening 112 is arranged. The bending foot body 12 provided with a bending foot 121 extending from the top cover 122 and then bending downward is pressed into the upper opening of the slot through the top cover 122. The rear portion of the pushing slider 13 located in the slot 111 passes through the opening 112 in the rear portion of the slot and is elastically pushed against the inner sidewall of the bending foot 1211 by the elastic member 14.

The elastic member 14 in this example embodiment may be a spring, the rear end of which is embedded into the opening 132 formed in the front end of the pushing slider, and the front end of which pushes against the front sidewall 1112 of the slot.

The surrounding sidewalls of the top cover 122 of the bending foot body are slid and embedded into the upper opening of the slot 111 of the mechanism body. After the embedding block 115 with the bending foot body and the pushing slider is embedded into the embedding hole 116 of the mechanism body 11, the bending foot body and the embedding block may be fixed to each other in up and down direction naturally, and the top cover being embedded into the upper opening of the slot may also be locked without sliding outward.

Figure 21:
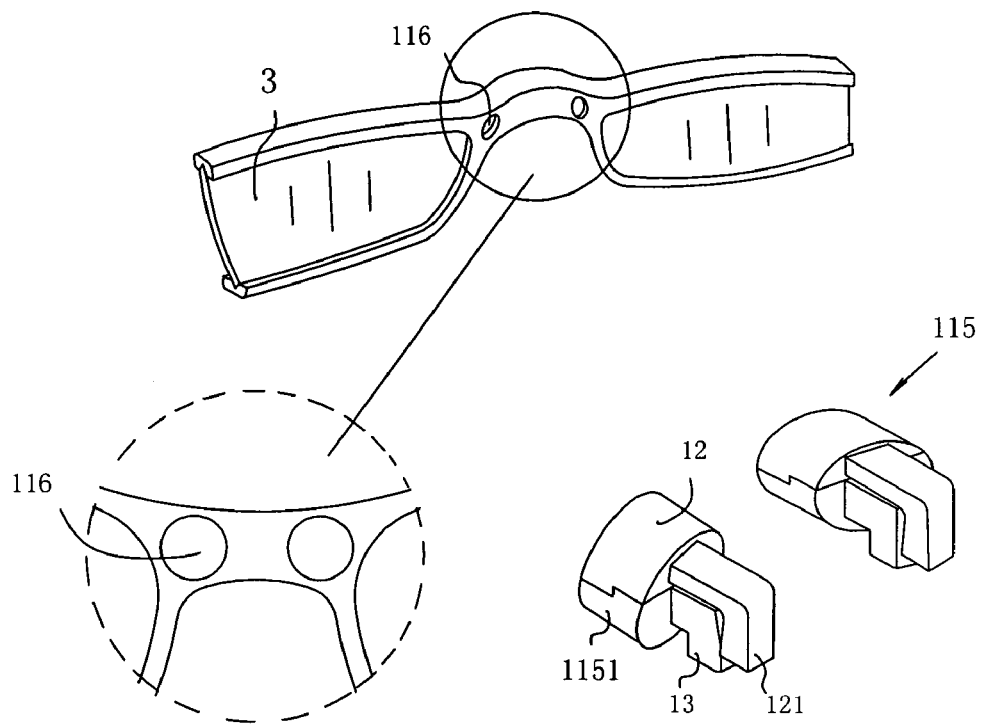
FIG. 21 is the schematic structural diagram of an example embodiment.
Figure 22:
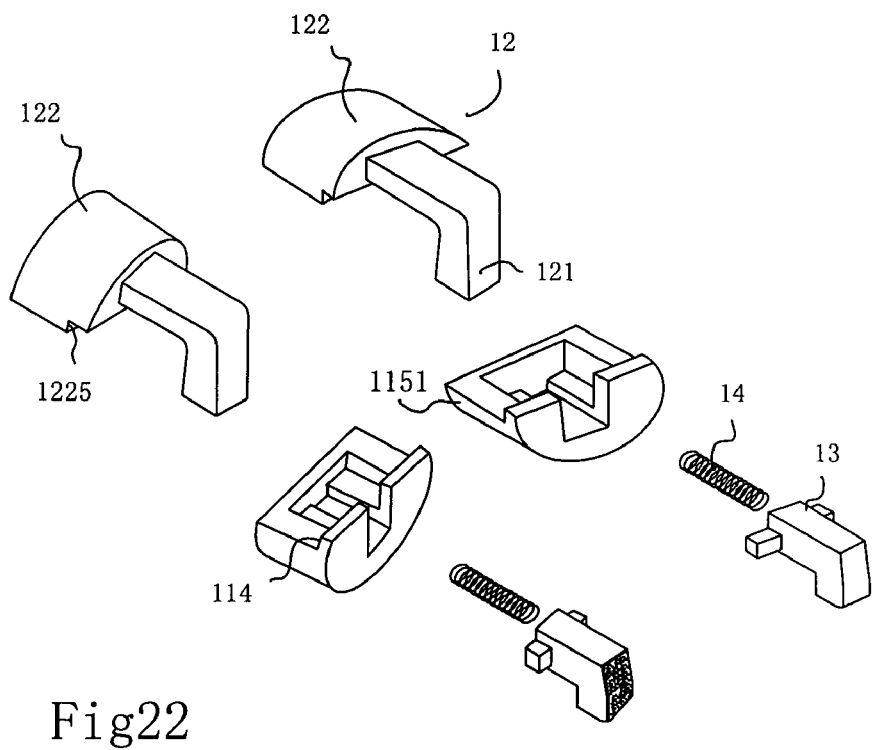
FIG. 22 is the exploded structural diagram of the embedding block of FIG. 21.

Referring to FIGS. 21 and 22, in an example embodiment, a step face 114 with a higher back portion may be arranged on the top end face of the assembling body of the embedding block 1151 and a step face 1225 which may fit with the step face 114 on the top end face of the embedding block 1151 may be arranged on the downside face of the top cover of the bending foot body. The top cover 122 of the bending foot body and the top end face of the assembling body 1151, which match each other with concave and convex faces, are embedded into the embedding hole 116 in the mechanism body. The step face 114 on the top end face of the embedding block may push against the top cover 122 inwards so as to prevent it from sliding outward after being applied to the elastic push force outward by the pushing slider 13.

Figure 23:
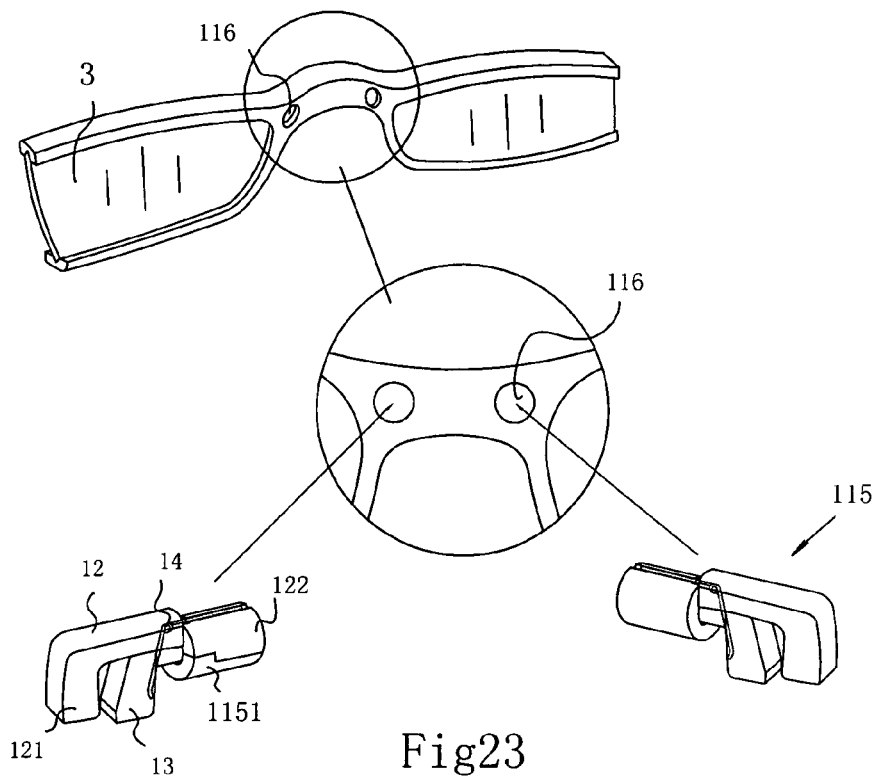
FIG. 23 is the schematic structural diagram of an example embodiment.
Figure 24:
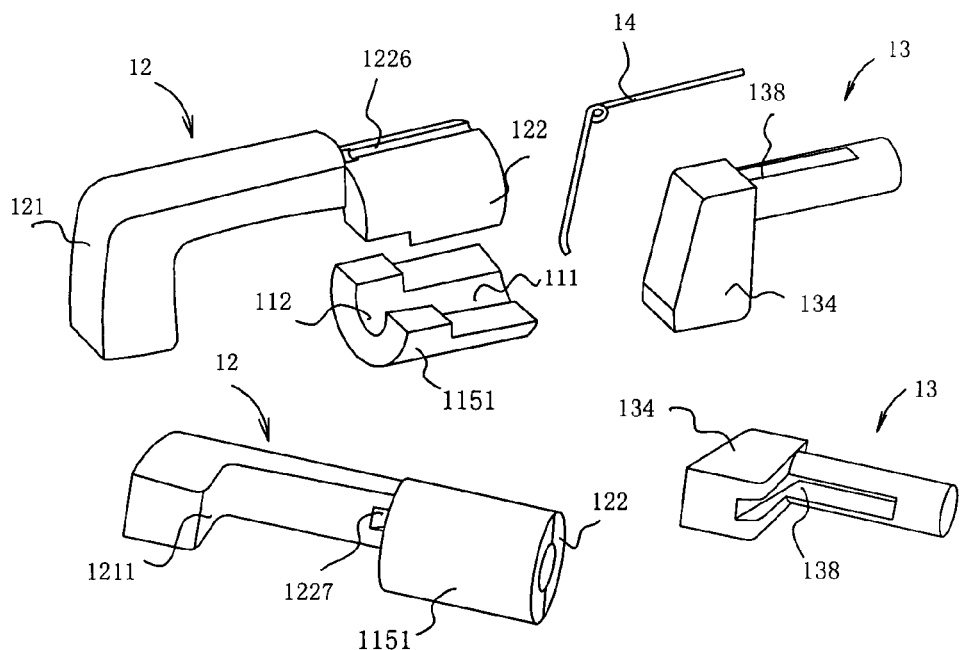
FIG. 24 is the exploded structural diagram of the embedding block of FIG. 23.

Referring to FIGS. 23 and 24, in an example embodiment, the embedding block 115 may be provided with an assembling block 1151 on the upper face of which a recessed slot 111 is arranged, and, a opening 112 may be formed in the rear side wall of the assembling block 1151. The bending foot body 12 having a bending foot 121 extending from the top cover and then bending downward from the top cover 122 is fastened to the upper opening of the slot 111 through the top cover 122. The pushing slider 13 provided with an elastic member 14, the rear end of which is elastically pushed against the inner sidewall 1211 of the bending foot 121 through the opening 112 on the back side of the slot. The lower wall face of the top cover 122 of the bending foot body fits with the top end face of the assembling body 1151 with concave and convex faces.

As compared with FIGS. 21 and 22, the difference is that the connecting structure of the elastic member 14 and the pushing slider may be: the pushing slider 13 fits with the assembling block 1151 and the top cover 122 of the bending foot body slidingly, and the pushing slider 13 is provided with a bending body 134 in the rear portion. And the elastic member 14 may be a torsion spring, one torsion arm of which is located in the groove 1226 in the upper wall face of the top cover 122 of the bending foot body while the other one passes through the through hole 1227 of the top cover of the bending foot body and the through hole 138 of the pushing slider 13 downward to push against the front sidewall of the bending body 134 of the pushing slider by an elastic force. Thus, the rear end face of bending body 134 is elastically pushed against the inner sidewall 1211 of the bending foot 121 of the top cover.

Figure 25:
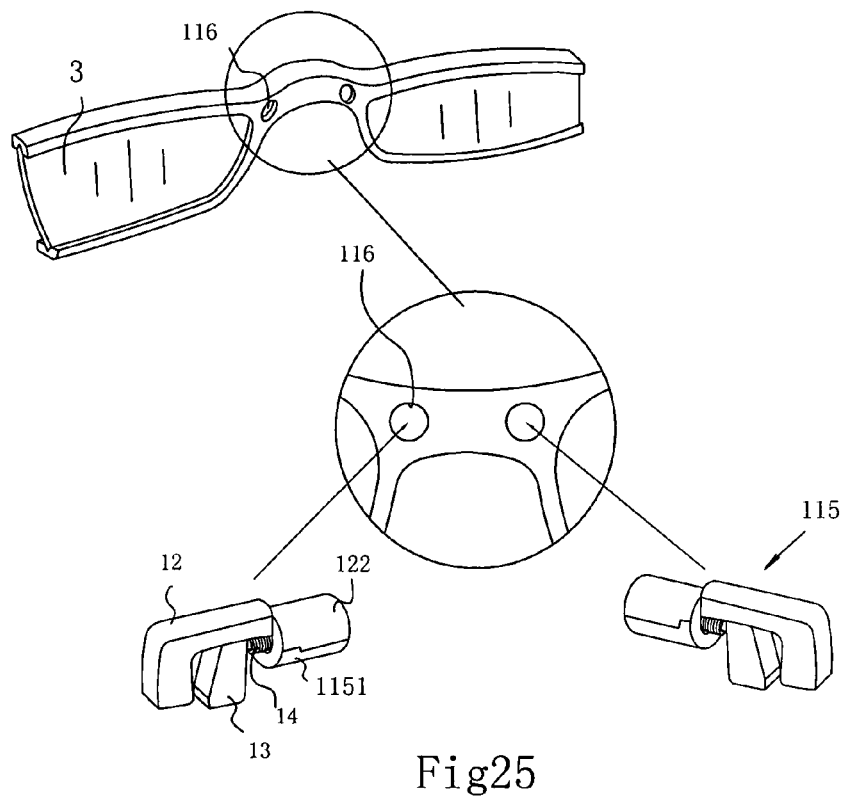
FIG. 25 is the schematic structural diagram of an example embodiment.
Figure 26:
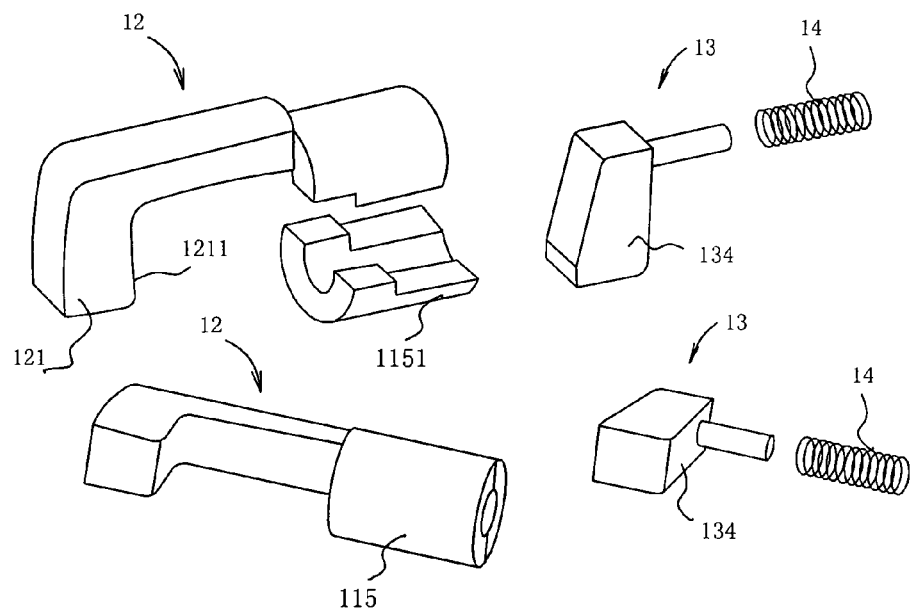
FIG. 26 is the exploded structural diagram of the embedding block of FIG. 25.

Referring to FIGS. 25 and 26, in an example embodiment, the connecting structure of the elastic member 14 and the pushing slider may be: the pushing slider 13 is provided with a bending body 134 in the rear portion of the main body horizontally, and the elastic member 14 is a spring around the horizontal main body of the pushing slider, the rear end of which pushes against the front sidewall of the bending body 134 by an elastic force. Thus, the rear end face of the bending body 134 is pushed elastically against the inner sidewall 1211 of the bending foot 121.

To make the spring produce an elastic force, its front end may be pushed against the step in the front part of the slot 111.

Figure 27:
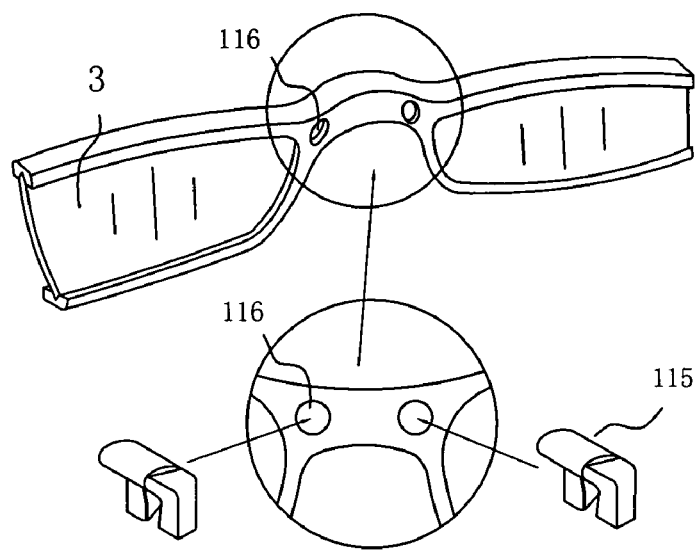
FIG. 27 is the schematic structural diagram of an example embodiment.
Figure 28:
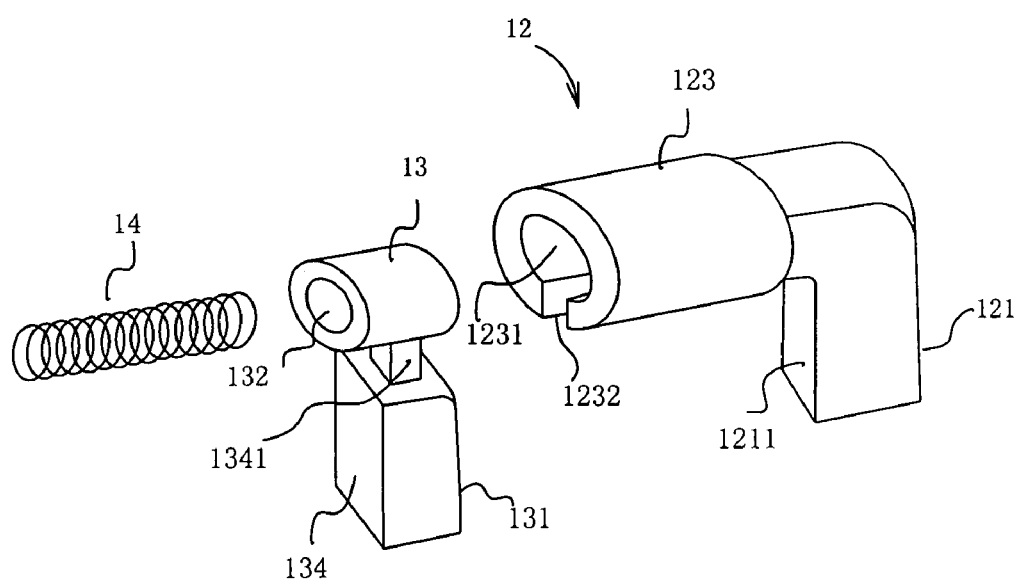
FIG. 28 is the exploded structural diagram of the embedding block of FIG. 27.

Referring to FIGS. 27 and 28, the embedding block 115 may include the bending foot body 12, the elastic member 14 and the pushing slider 13 in an example embodiment. The horizontal main body 123 of the bending foot body may be provided with a sliding cavity 1231 with an opening at the front and there is an open sliding slot 1232 in the bottom of the sliding cavity. A downward bending body 134 is arranged on the horizontal main body of the pushing slider 13 which is slid and fitted into the sliding cavity 1231 of the horizontal main body of the bending foot body. The neck of the bending body in the cross linking of the bending body 134 and the horizontal main body of the pushing slider is embedded into the sliding slot 1232 in the bottom of the sliding cavity of the horizontal main body. The elastic member 14 is a spring with its rear end pushed into the hole 132 in the front end of the horizontal main body of the pushing slider by an elastic force. Thus, the rear end face of the bending body 134 of the pushing slider is elastically pushed against the inner sidewall 1211 of the bending foot 121. The embedding block 115 is embedded into the embedding hole 116 of the mechanism body by the horizontal main body 123 which complements with the embedding hole 116 in the mechanism body 11 in profile, and the front end of the elastic member 14 is pushed against the inner end face of the embedding hole 116

Figure 29:
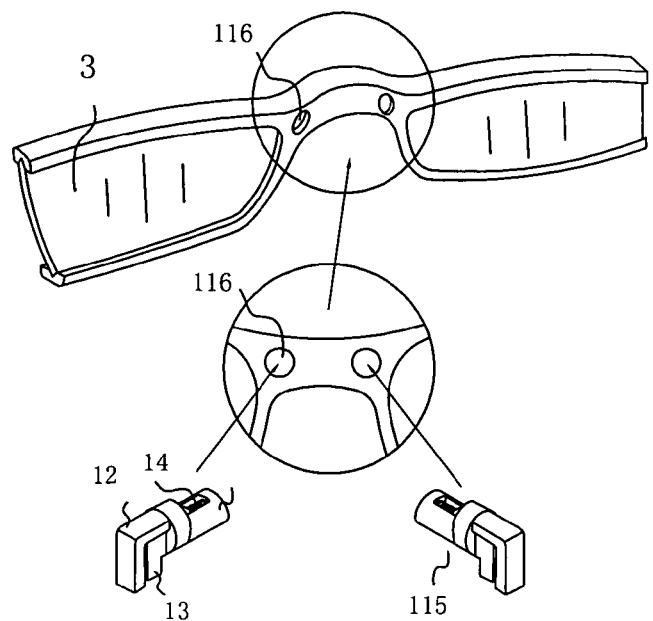
FIG. 29 is the schematic structural diagram of an example embodiment.
Figure 30:
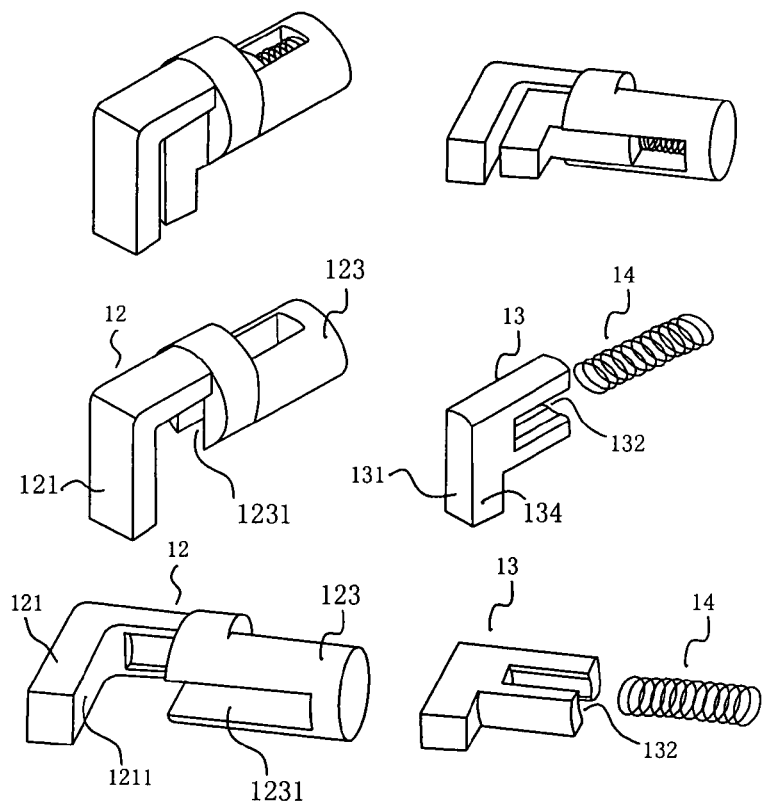
FIG. 30 is the exploded structural diagram of the embedding block of FIG. 29.

Referring to FIGS. 29 and 30, the embedding block 115 may include the bending foot body 12, the elastic member 14 and the pushing slider 13 in an example embodiment. The horizontal main body 123 of the bending foot body may be provided with a sliding cavity 1231 having an opening at the rear and lower portion. The bending foot 121 extends backward from the upper position of the opening of the sliding cavity 1231 in the rear end face of the horizontal main body 123 of the bending foot body and then bends downwardly. A downward bending body 134 is arranged on the horizontal main body of the pushing slider 13 that is slid and embedded into the sliding cavity 1231 of the horizontal main body of the bending foot body. The elastic member 14 may be a spring, the rear end of which is pushed into the opening 132 in the front end of the horizontal main body of the pushing slider by an elastic force, and thus the rear end face of the bending body 134 of the pushing slider is pushed elastically against the inner sidewall 1211 of the bending foot 121. The embedding block 115 is embedded into the embedding hole 116 of the mechanism body by the horizontal main body 123 which complements with the embedding hole 116 in the mechanism body 11 in profile.

Figure 31:
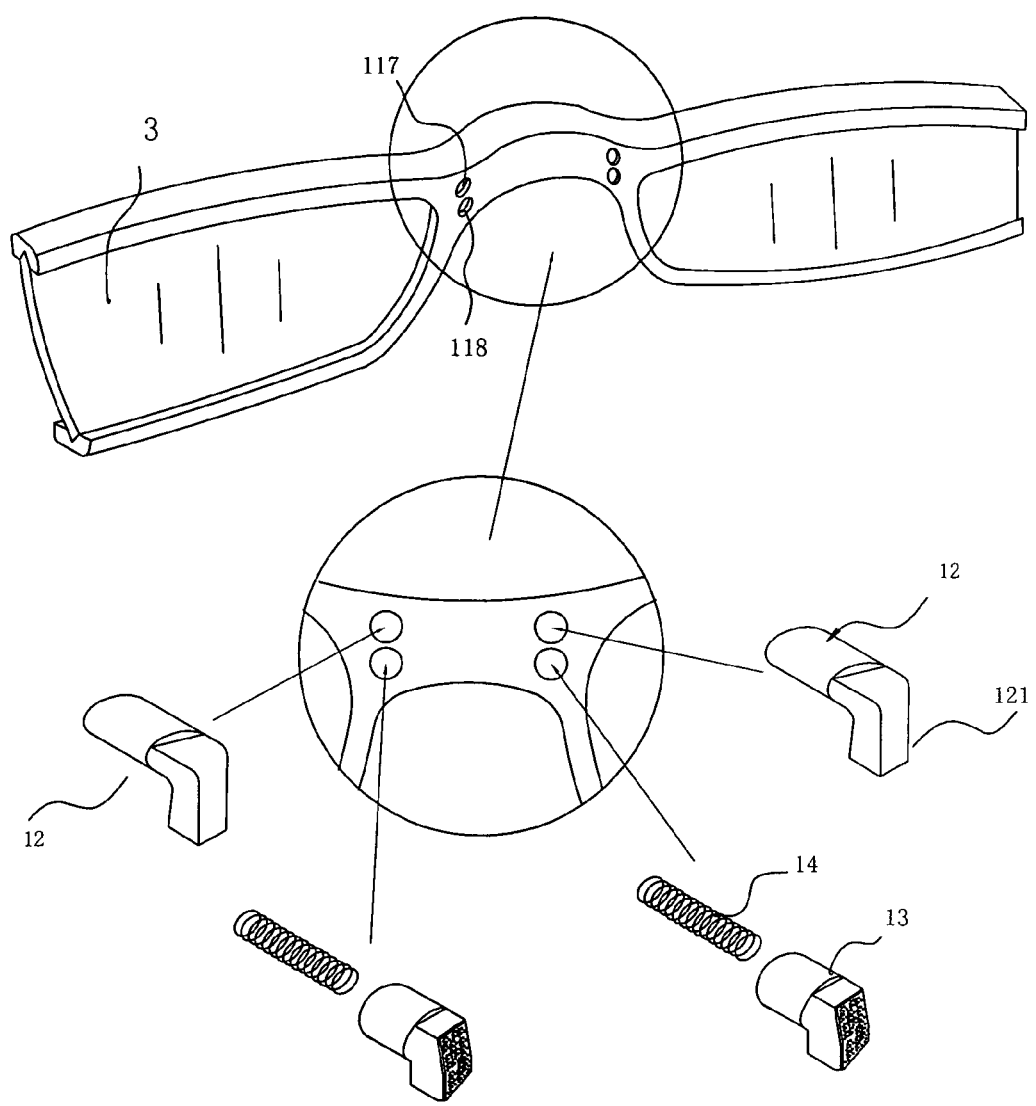
FIG. 31 is the schematic structural diagram of an example embodiment.

Referring to FIG. 31, the mechanism body 11 may be provided with two upper embedding holes 117 horizontally in an example embodiment, and two bending foot bodies 12 may be embedded into the two upper embedding holes 117 respectively. Elastic members 14 are mounted into the lower embedding holes 118 below the upper embedding holes. The two pushing sliders 13 are slid into the two lower embedding holes 118 in the front end. The rear end of elastic member is pushed against the pushing slider by an elastic force, and thus the rear end of the pushing slider is pushed elastically against the inner sidewall of the bending foot 121 of the bending foot body.

While the present invention has been particularly shown and described with reference to exemplary embodiments thereof, it will be understood by those of ordinary skill in the art that various changes in form and details may be made therein without departing from the spirit and scope of the present invention as defined by the following claims

The invention claimed is:

1. A auxiliary spectacles provided with a clamping mechanism, comprising:
two lenses; and
a mechanism body, onto ends of which the two lenses are mounted,
wherein the mechanism body between the two lenses of the auxiliary spectacles is provided with an elastic pushing clamping body, the elastic pushing clamping body includes at least one bending foot body provided with at least one bending foot extending backward and then bending downwardly, the bending foot body being fixed to the mechanism body, and the mechanism body being provided with at least one pushing slider which can be pressed elastically, and a rear end of the pushing slider being pushed elastically against an inner sidewall of the at least one bending foot.

2. The auxiliary spectacles of claim 1, wherein a recessed slot in a rear portion, of which at least one opening is provided with, is formed on a top end face of the mechanism body, and the at least one bending foot body, which is provided with the at least one bending foot extending backward from a top cover and then bending downwardly, is fastened to an upper opening of the slot by the top cover, a rear portion of the at least one pushing slider positioned in the slot passes through the at least one opening and is pushed elastically against the inner sidewall of the at least one bending foot body by the elastic member.

3. The auxiliary spectacles of claim 2, wherein the at least one opening is formed by cutting downwardly from a top end face of a rear sidewall of the slot, the at least one pushing slider slides through the at least one opening in the rear sidewall of the slot and the elastic member is mounted between the front end of the at least one pushing slider and the front sidewall of the slot.

4. The auxiliary spectacles of claim 3, further comprising:
at least one guiding slot extending from the bottom of the opening in the rear sidewall to a bottom of front sidewall and is formed in the bottom of the slot, and the at least one pushing slider is slid and embedded into the at least one guiding slot; and
a locking block protruded from a side portion is arranged on the sidewall of the pushing slider and fitted with a guiding face formed between the side portion of the at least one guiding slot and an upper bottom of the slot.

5. The auxiliary spectacles of claim 2, wherein an opening is formed in a front-end face of the at least one pushing slider, the elastic member being a spring, and the front end being pushed against the front sidewall of the slot while the rear end thereof is inserted into an opening of the at least one pushing slider, and the elastic member being pushed against the at least one pushing slider backwardly by an elastic force of the elastic member such that the at least one pushing slider and the at least one bending foot form the elastic pushing clamping body.

6. The auxiliary spectacles of claim 2, wherein two openings and two pushing sliders slide across the openings, respectively, the two pushing sliders being pushed elastically against the inner sidewall of the at least one bending foot of the bending foot body by the elastic force of the elastic members.

7. The auxiliary spectacles of claim 6, wherein the at least one bending foot body has two bending feet extending backward from the top cover of the bending foot body and then bending downwardly, and the inner sidewall of the bending foot body being pushed against elastically by the two pushing sliders.

8. The auxiliary spectacles of claim 6, wherein a locking member passes through a positioning hole in the bottom of the slot and the positioning hole in the top cover of the bending foot body to connect the bending foot body with the mechanism body.

9. The auxiliary spectacles of claim 6, wherein the elastic member is a torsion spring having two torsion arms, and end portions of the two torsion arms of the torsion spring are connected with the two pushing sliders.

10. The auxiliary spectacles of claim 9, wherein the end portions of the two torsion arms of the torsion spring are inserted into positioning holes in sidewalls of the pushing slider on the left and right, respectively, so that the two pushing sliders is pushed against the inner sidewall of the bending foot by the elastic force of the torsion spring, the locking member passes through the positioning hole in the bottom of the slot and the positioning hole in the top cover of the bending foot body to connect the bending foot body with the mechanism body, and the torsion ring in a middle of the torsion spring being around the locking member located in a middle portion of the mechanism body.

11. The auxiliary spectacles of claim 6, wherein front ends of the two pushing sliders are connected integrally with a crossbeam of the pushing slider in the slot, and the crossbeam of the two pushing sliders and front sidewall of the slot being connected elastically by the elastic member.

12. The auxiliary spectacles of claim 11, wherein a guiding slot in a front-rear direction is arranged in the bottom of the slot, a downward convex face arranged on a bottom of the crossbeam of the pushing slider is slid and embedded into the guiding slot.

13. The auxiliary spectacles of claim 11, wherein an opening is arranged in a front end-face of the crossbeam of the at least one pushing slider, the elastic member being a spring, and the front end being pushed against the front sidewall of the slot, and the rear end being inserted into the opening in the front-end face of the crossbeam of the pushing slider, such that the pushing slider is pushed backwardly by the elastic force of elastic member.

14. The auxiliary spectacles of claim 11, wherein two extension walls are arranged in the front portion of the crossbeam of the two pushing sliders, and the elastic member being a torsion spring having two foot ends and a middle end arranged around an axis between the two extension walls, and the two foot ends and the middle end of the torsion spring push against the crossbeam of the pushing slider and the front sidewall of the slot respectively.

15. The auxiliary spectacles of claim 11, wherein the crossbeam of the two pushing sliders is an elastic member having a protruding portion elastically pushing against the front sidewall of the slot.

16. The auxiliary spectacles of claim 15, wherein positioning holes are arranged in opposite inner sidewalls of the two pushing sliders, the elastic member having two ends inserted into the positioning holes respectively, a recessed positioning slot being arranged in the front sidewall of the slot with a front portion of the elastic member being embedded into the positioning slot to push the pushing slider backward against the inner sidewall of the bending foot through the elastic force.

17. The auxiliary spectacles of claim 15, wherein the elastic member is made of elastic materials and integral with the two pushing sliders on both ends, the protruding portion being flexed forward against the front sidewall of the slot, and pushes the two pushing sliders elastically backward against the inner sidewall of the bending foot through the elastic force generated after the flex of the material.

18. The auxiliary spectacles of claim 1, wherein the at least one bending foot body and the at least one pushing slider are mounted on an embedding block which is integrally connected with the mechanism body by embedding into the embedding hole arranged in the mechanism body.

19. The auxiliary spectacles of claim 18, wherein the embedding block is embedded into an at least one embedding hole that is arranged in the mechanism body and matches with the embedding block in the profile by supersonic wave or locking directly.

20. The auxiliary spectacles of claim 18, wherein two embedding blocks being arranged are respectively embedded into two embedding holes which are in the mechanism body along a horizontal direction.

21. The auxiliary spectacles of claim 20, wherein each of the embedding blocks includes an assembling block, and a recessed slot is arranged in an upper end face of the assembling block, and the opening is arranged in the rear portion of the slot, the at least one bending foot body, provided with a bending foot extending backward from the top cover and then bending downwardly, being pressed into the upper opening of the slot through the top cover, the rear portion of the at least one pushing slider located in the slot passes through the opening in the rear portion of the slot and being pushed elastically against the inner sidewall of the bending foot by the elastic member.

22. The auxiliary spectacles of claim 21, wherein a step face with a higher back portion is arranged on the upper end face of the assembling block of the embedding block, and a step face which can fit with the step face on a top end face of the embedding block is arranged on the downside face of the top cover of the bending foot body, the top cover of the bending foot body and the upper end face of the assembling block, which fit with each other with concave and convex faces, are embedded into the embedding hole in the mechanism body.

23. The auxiliary spectacles of claim 21, wherein the downside face of the top cover of the at least one bending foot body fits with the upper end face of the assembling block with a slot and with concave and convex faces, the at least one pushing slider slides into and fits with the assembling block and the top cover of the at least one bending foot body, the at least one pushing slider being provided with a bending body in the rear portion, and the elastic member being a torsion spring, and one torsion arm of the torsion spring being located in a groove in the upper wall face of the top cover of the at least one bending foot body, while the other one passes through a through hole of the top cover of the bending foot body and a through hole of the at least one pushing slider downwardly to push against the front sidewall of the bending body of the pushing slider by an elastic force, so that the rear end face of bending body is pushed elastically against the inner sidewall of the bending foot of the top cover.

24. The auxiliary spectacles of claim 21, wherein the downside face of the top cover of the at least one bending foot body fits with the upper end face of the assembling block with a slot and with concave and convex faces the at least one pushing slider being provided with a bending body in the rear portion of the main body horizontally, and the elastic member being a spring around the horizontal main body of the pushing slider with the rear end pushing against the front sidewall of the bending body by an elastic force, so that the rear end face of the bending body is pushed elastically against the inner sidewall of the bending foot of the at least one bending foot body.

25. The auxiliary spectacles of claim 20, wherein each of the two embedding blocks includes a bending foot body, an elastic member and a pushing slider, the horizontal main body of the bending foot body being provided with a sliding cavity open to the front and a through sliding slot in the bottom of the sliding cavity, a downward bending body being arranged on the horizontal main body of the pushing slider, and the horizontal main body being slid and embedded into the sliding cavity of the horizontal main body of the bending foot body, the neck of the bending body in the cross linking of the bending body and the horizontal main body of the pushing slider being embedded into the sliding slot in the bottom of the sliding cavity, and the elastic member being a spring with the rear end pushed into the hole in the front end of the horizontal main body of the pushing slider by an elastic force, such that the rear end face of the bending body of the pushing slider is pushed elastically against the inner sidewall of the bending foot, and each of the two embedding blocks being embedded into the embedding hole of the mechanism body by the horizontal main body which complements with the embedding hole in the mechanism body in profile.

26. The auxiliary spectacles of claim 20, wherein each of the two embedding blocks includes a bending foot body, and elastic member and a pushing slider, the horizontal main body of the bending foot body being provided with a sliding cavity opening to the rear and lower portion, the bending foot extends backward from the upper position of the opening of the sliding cavity in the rear end face of the horizontal main body of the bending foot body and then bends downwardly, a downward bending body being arranged on the horizontal main body of the pushing slider which is slid and embedded into the sliding cavity of the horizontal main body of the bending foot body, the elastic member being a spring, the rear end of which is pushed against the opening in the front end of the horizontal main body of the pushing slider by an elastic force, to push the rear end face of the bending body of the pushing slider elastically against the inner sidewall of the bending foot of the bending foot body, each of the two embedding blocks being embedded into the embedding hole of the mechanism body by the horizontal main body which complements with the embedding hole in the mechanism body in profile.

27. The auxiliary spectacles of claim 1, wherein the mechanism body is provided with two upper embedding holes horizontally, and the two bending foot body are embedded into the two upper embedding holes, respectively, in the lower embedding hole below the upper embedding hole an elastic member is mounted, the two pushing sliders being slid and inserted into the two lower embedding holes in the front end, the rear end of elastic member pushes against the pushing slider through an elastic force, such that the rear end of the pushing slider is pushed elastically against the inner sidewall of the bending foot.

28. The auxiliary spectacles of claim 1, wherein layers made of elastic materials are arranged on a holding portion between the rear end of the at least one pushing slider and the inner sidewall of the bending foot.

29. The auxiliary spectacles of claim 1, wherein the mechanism body is integral with spectacle frames of the auxiliary spectacles lenses on both ends.

30. The auxiliary spectacles of claim 1, wherein the mechanism body is connected on both ends with an auxiliary spectacle lenses by connecting members respectively.

* * * * *